United States Patent
Toney et al.

(10) Patent No.: US 9,757,738 B2
(45) Date of Patent: Sep. 12, 2017

(54) ELECTROSTATIC FILTRATION SYSTEM FOR A DIELECTRIC FLUID

(71) Applicant: IRION FILTRATION, LLC, Cypress, TX (US)

(72) Inventors: Derek Wayne Toney, Magnolia, TX (US); Robert William Bowden, Katy, TX (US)

(73) Assignee: PUREFLO FILTRATION, LLC, Cyprus, TX (US)

( * ) Notice: Subject to any disclaimer, the term of this patent is extended or adjusted under 35 U.S.C. 154(b) by 342 days.

(21) Appl. No.: 14/509,005

(22) Filed: Oct. 7, 2014

(65) Prior Publication Data

US 2015/0314304 A1    Nov. 5, 2015

Related U.S. Application Data

(60) Provisional application No. 61/988,041, filed on May 2, 2014.

(51) Int. Cl.
*B01D 35/06* (2006.01)
*B01D 17/06* (2006.01)
*B03C 5/02* (2006.01)
*B03C 5/00* (2006.01)

(52) U.S. Cl.
CPC .............. *B03C 5/02* (2013.01); *B01D 17/06* (2013.01); *B01D 35/06* (2013.01); *B03C 5/00* (2013.01)

(58) Field of Classification Search
CPC ............................... B01D 17/06; B01D 35/06
USPC ......................... 204/665, 672–674
See application file for complete search history.

(56) References Cited

U.S. PATENT DOCUMENTS

| | | |
|---|---|---|
| 3,252,285 A | 5/1966 | Griswold |
| 3,544,441 A | 12/1970 | Griswold |
| 3,729,402 A | 4/1973 | Griswold |
| 3,852,178 A | 12/1974 | Griswold |
| 3,891,528 A | 6/1975 | Griswold |
| 4,594,135 A | 6/1986 | Thompson |
| 4,961,845 A | 10/1990 | Dawson |
| 5,242,587 A | 9/1993 | Barrington |
| 5,332,485 A | 7/1994 | Thompson |
| 5,785,834 A | 7/1998 | Thompson |
| 6,129,829 A | 10/2000 | Thompson |
| 6,284,118 B1 | 9/2001 | Thompson |
| 6,576,107 B2 | 6/2003 | Thompson |
| 8,021,523 B2 | 9/2011 | Jarvis |
| 2006/0278514 A1 | 12/2006 | Bowden et al. |

*Primary Examiner* — Brian W Cohen
(74) *Attorney, Agent, or Firm* — Gerow D. Brill

(57) ABSTRACT

This disclosure provides for an improved electrostatic filtration system for removing contaminants from a dielectric fluid that overcomes arcing concerns, resistance burns and fluid flow concerns. The system has three major elements: an electrostatic filtration cartridge; an electrostatic filtration cartridge housing; and an electrostatic filtration system housing. It is within the electrostatic filtration cartridge where the apparatus and method for addressing the arcing concerns and fluid flow concerns reside. The electrostatic filtration cartridge includes at least one set of m conductive plates (m set) and at least one set of n conductive plates (n set). Within the sets (m set and n set) of conductive plates, the conductive plates are directly coupled by a series of conductive connecting portions. Each individual conductive plate includes a cutaway portion to avoid electrical contact between one set of conductive plates and an adjacent conductive connecting portion within another set of conductive plates.

30 Claims, 25 Drawing Sheets

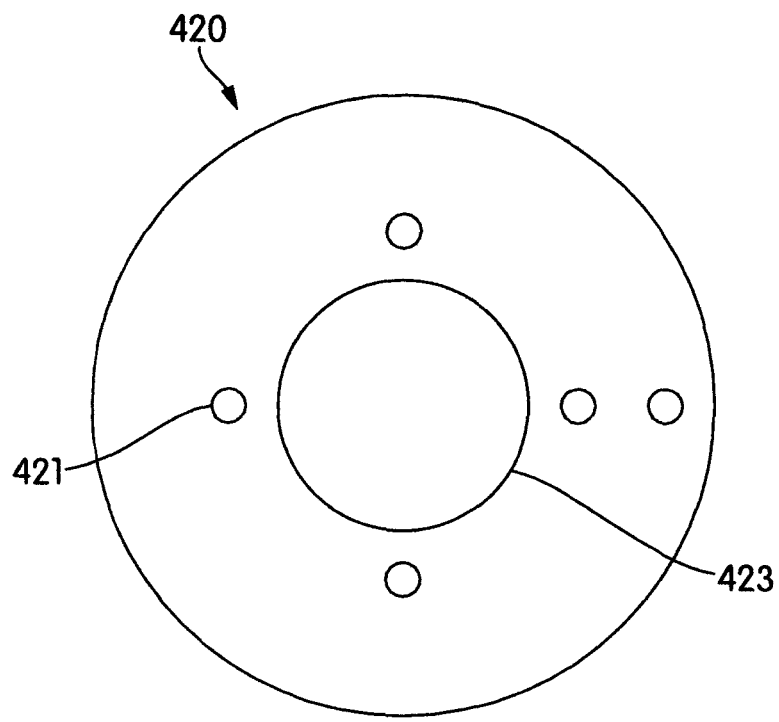
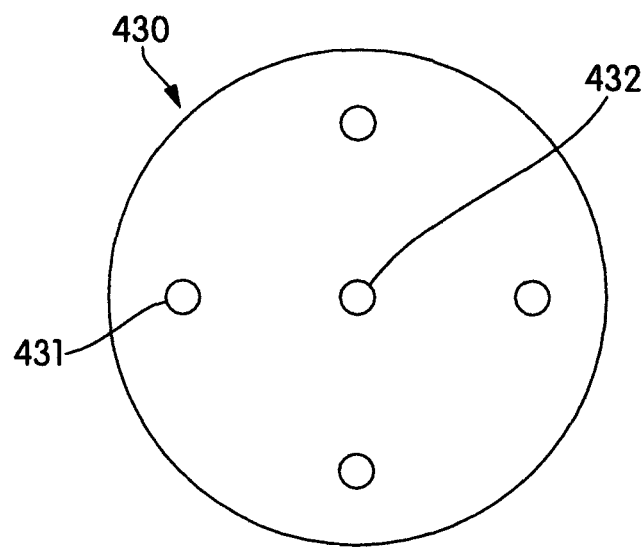
FIG. 2b
PRIOR ART

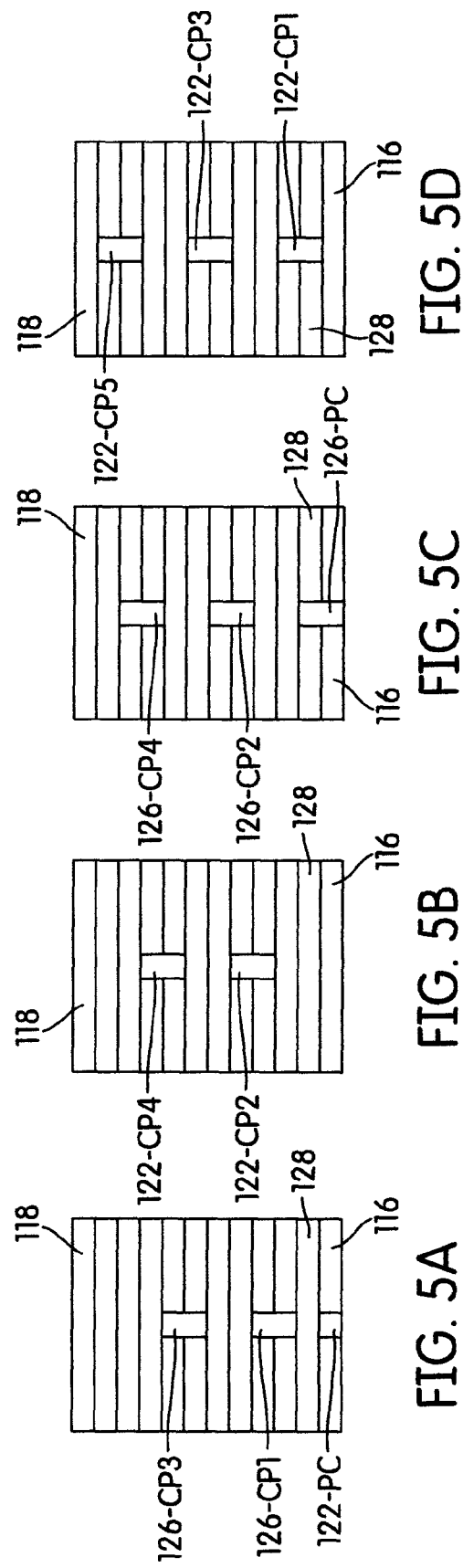

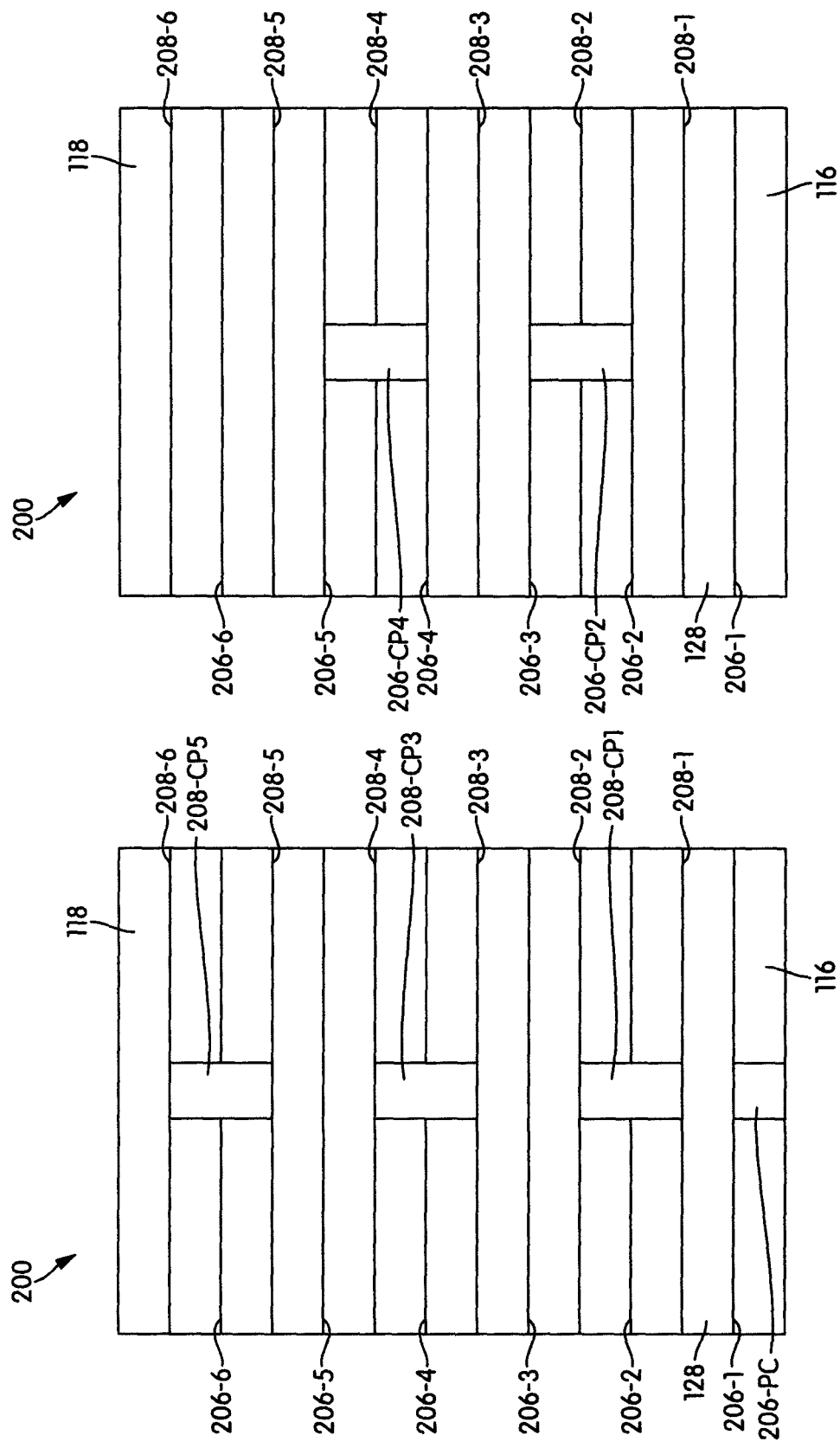

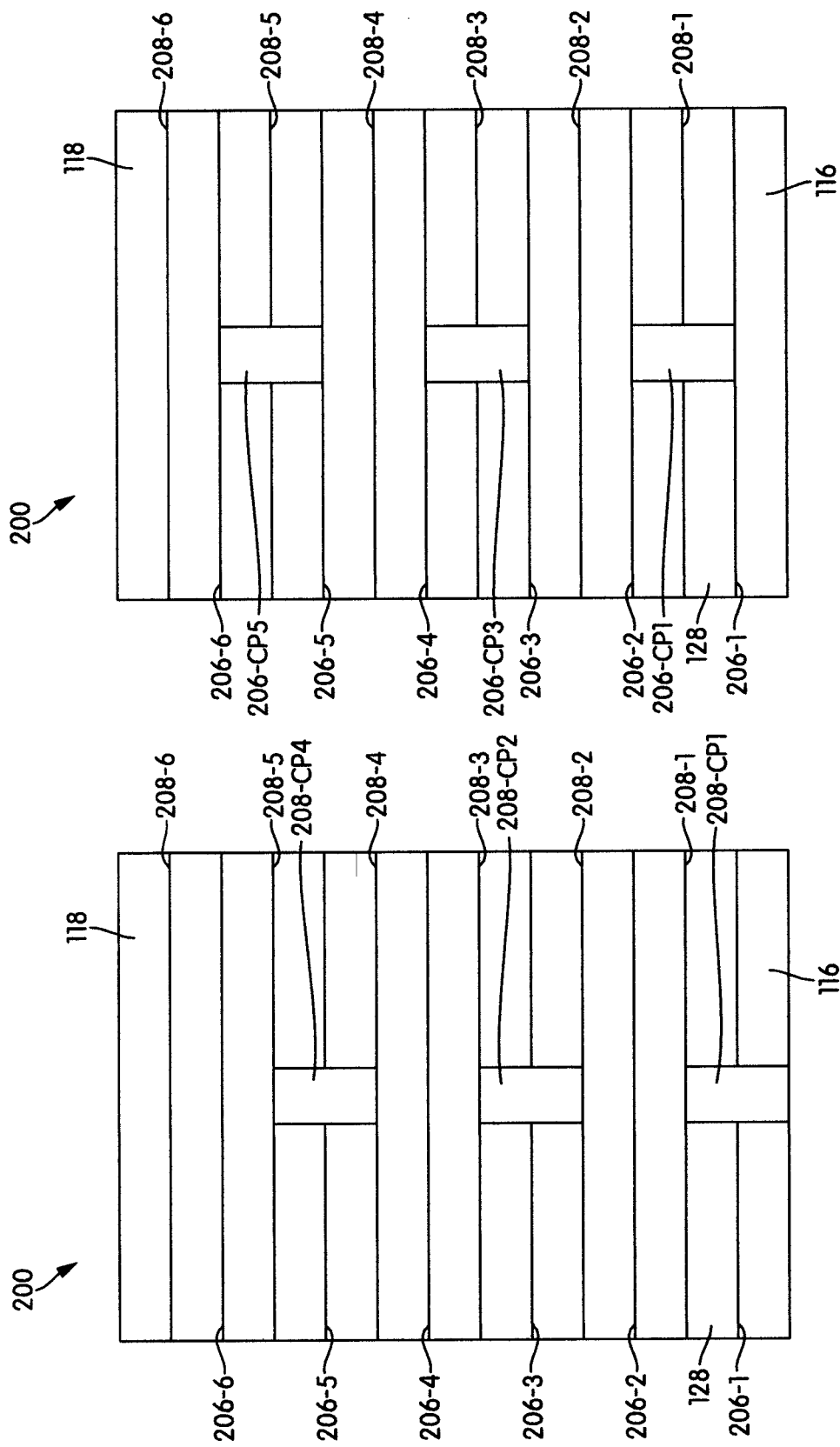

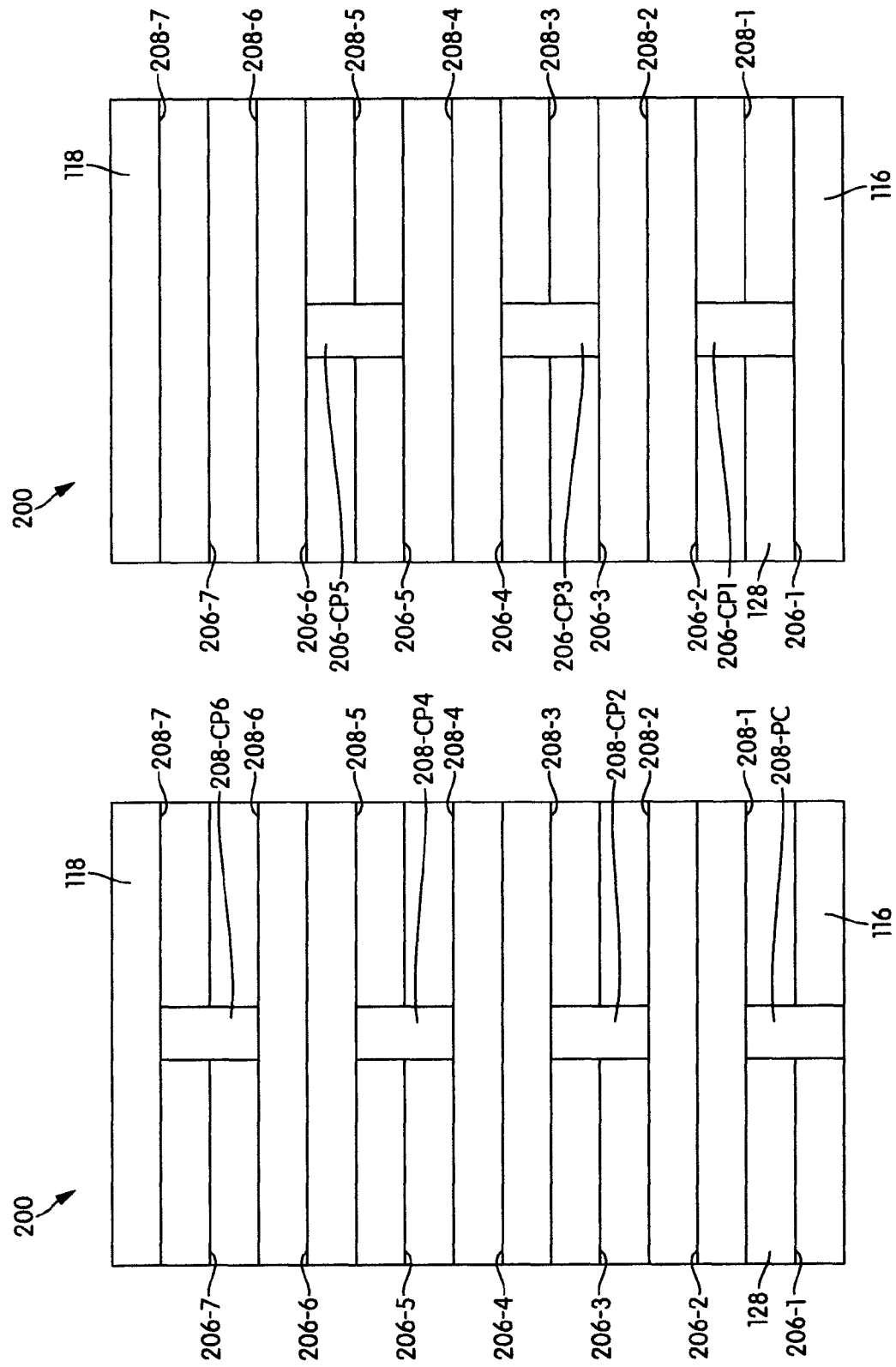

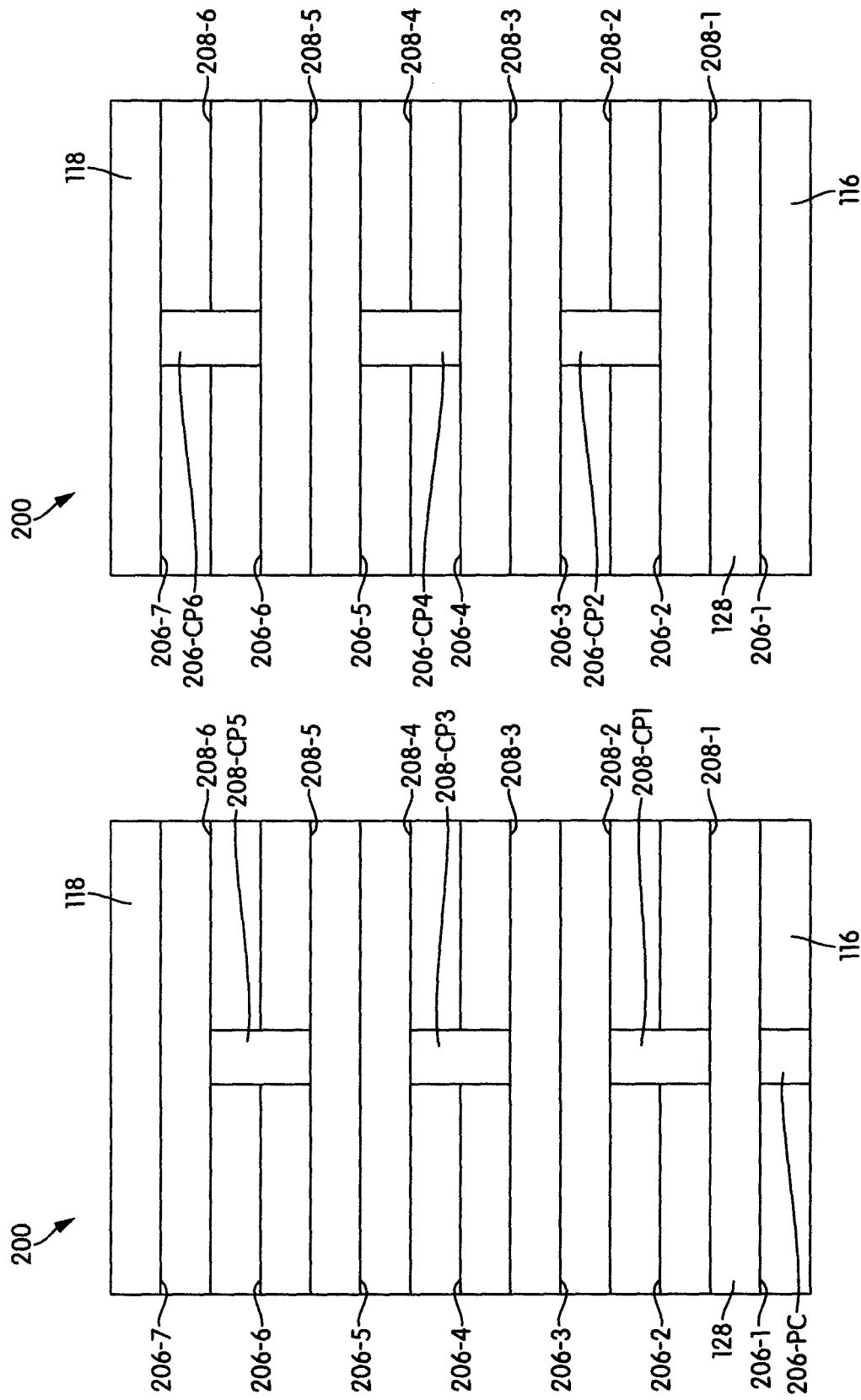

ELECTROSTATIC FILTRATION SYSTEM FOR A DIELECTRIC FLUID

CROSS REFERENCE

This application is related to provisional application Ser. No. 61/988,041 ('041) filed on May 2, 2014 entitled "Electrostatic Filtration System for Dielectric Fluid" and is hereby incorporated herein in full by reference. The '041 application was filed under post-AIA rules since it was filed after Mar. 16, 2013. This is also related to PCT application number PCT/GB2014/052712 filed on 8 Sep. 2014 and is hereby incorporated in full by reference.

BACKGROUND OF THE DISCLOSURE

Field of the Disclosure

This disclosure relates to an improved electrostatic filtration system and methods for the system's use for the removal of contaminants from a dielectric fluid.

Description of the Prior Art

Early prior art filters include filters for removing particles from various dielectric fluids such as lubricating oils and hydraulic fluids by employing mechanical filtration. When mechanical filtration is employed to filter very fine particles, i.e., below about 3 microns, difficulties may be encountered because these relatively small particles may require large bulk and volume filters to avoid significant system pressure drops caused by the necessarily small openings in the filter media.

Several earlier patents by Donald Thompson replaced mechanical filters for fine particle filtration of dielectric fluids with electrostatic filters where the fluid is passed through a number of perforated electrodes which are alternately charged with relatively high positive and negative direct current (D.C.) voltages.

Porous filter media was placed between the charged plates for trapping the particles and extends across the entire internal cross-sectional area of the filter. It appears that the particles when subjected to the electric fields created by the application of a voltage to the charged plates were captured by one of two possible ways. The filter media itself may be charged, with the particles being attracted to the filter media itself. More likely, however, the particles were charged either positively or negatively depending on their composition and the oppositely charged particles were attracted to each other and eventually flow together into agglomerate (clumps) which would be large enough to be trapped in the filter media. When enough clumps form to effectively block the filter or produce an undesirable pressure drop, the filter media would be replaced.

This can result in the required use of a very large diameter filter or a large number of filters when higher flow rates are desired. Accordingly, a continuing effort was directed to the development of improved electrostatic filters which led to the issuance of the U.S. Pat. No. 5,785,834 ('834) issued Jul. 28, 1998, U.S. Pat. No. 6,129,829 (829) issued Oct. 10, 2000, U.S. Pat. No. 6,284,118 ('118) issued Sep. 4, 2001, and U.S. Pat. No. 6,576,107 ('107) issued Jun. 10, 2003, all issued to Donald E. Thompson. The '107 series of patents are all based upon the US 2001/0037941 patent application specification. This series of patents (referred to as the Thomson '107 family) are hereby incorporated in their entirety by reference. The U.S. Pat. No. 6,576,107 patent is owned by the Assignee/Applicant of the instant application.

The '834, '829, '118 and '107 patents overcame difficulties with earlier patents where the flow of the contaminated fluid through the filter was axial and utilized electrodes separated by layers of filter media. The electrodes were alternately oppositely charged with the filtration process taking place by flowing the contaminated fluid upwardly through the electrodes and the filter media between the plates.

However, the design of the Thompson '107 family of patents developed an arcing problem that created ohmic resistance paths between the high voltage source and the filter elements. These areas of ohmic resistance reduce the overall efficiency of the filter.

To illustrate the cause of these areas of ohmic resistance, FIG. 4 of the '107 family of Thomson patents illustrates a potential cause of this arcing problem is illustrated herein as prior art (FIG. 1 herein).

The discussion of FIG. 1 herein (FIG. 4 of Thompson '107 family) appears at Column 4 Line 61 to Column 5 Line 35 in each of the Thompson '107 family.

As discussed in the Thompson '107 family specifications, FIG. 1 illustrates the '107 family method of transfer of electricity utilizing two charged electrical rods (One Positive and One Negative). This is how the '107 family of filters transfers its electricity from the bottom of the housing to the filter elements themselves. It utilizes insulator-charged springs to transfer the high voltage field up through the filter. However, this created a problem in that electrical arcing developed, creating and undesired ohmic resistance paths that would accumulate between the plates due to the lack of a solid connection point to transfer the voltage. A small arcing burn would be left on the plates at each point where the springs and plates were in contact, indicating that there was not sufficient contact with the conductive surface to allow high voltage electricity to flow efficiently through the filter elements.

There is a need for an electrostatic filtration device that can efficiently transfer the high voltage power to its charged plates without arcing developing at contact points between the source and the plates.

A second example of prior art is illustrated by U.S. Pat. No. 8,021,523 ('523) by Jarvis entitled "Apparatus and Method for Electrostatic Filtration of Fluids" issued on Sep. 20, 2011 and is hereby incorporated by reference in its entirety herein.

FIGS. 4, 4A, 4B and 9 from '523 patent are copied herein as prior art in FIGS. 2, 2A, 2B 2C. The discussion of FIGS. 2, 2A, 2B 2C is found in the '523 patent specification between: Column 10 Line 36 to Column 10 Line 45; between Column 11 Line 11 to Column 12 Line 67; and between Column 15 Line 3 to Column 15 Line 25.

The '523 device may have been an improvement over the Thompson '107 series, but the Applicant has concerns that arcing may well occur in at least two areas of the '523 design. Firstly, the use of multiple connecting elements such as the series of short metal rod sections 505 screwed together may be a haven for arcing, due to lack of total contact between the first and the second short metal rod sections 505. Such resistance burrs reduce the flow of high voltage and reduces the efficiency of the device. A second area of concern is the dependence on the contact of the negatively chargeable plates 420 which have an outer diameter that is machined to be only slightly smaller than the inner diameter of electrically conductive housing 320. In this fashion, each negatively chargeable plate 420 may make electrical contact with the inner wall of electrically conductive housing 320. Areas of non-contact by negatively chargeable plate 420 with the inner wall of electrically conductive housing 320 may well create resistance burrs that reduce the flow of high voltage and the efficiency of the device.

A separate concern for the '523 design is the flow of fluids as described in FIG. 2C. FIG. 2C illustrates a series flow of the contaminated fluid. When reviewing FIG. 2C it appears that this is a series flow of the contaminated fluid through the filtration cartridge. As shown in FIG. 2C, the fluid to be treated will flow upwards as it is introduced into the bottom of the cartridge, it will rise until it begins to contact the bottom of positively chargeable plates 430 and flow towards the outer wall of the conductive housing 320. Upon reaching the outer wall of housing 320, the fluid to be treated will eventually rise up, around, and over positively chargeable plates 430 until it contacts the lower surface of negatively chargeable plates 420 where it will then flow radially inward until it flows through the large opening in the center of negatively chargeable plates 420. The fluid to be treated will then flow through the opening. This process continues as the fluid to be treated is continually pumped into the bottom of housing 320, passing through filtration media 440 as it rises. The process will repeat until the fluid to be treated has passed over or through each layer of filtration cartridge. However, if any one of these filtration media 440 becomes clogged, the flow may stop, requiring replacement of the entire filtration cartridge. The first layer of filter media will be doing the mass extraction of polar material and may blind (clog) the media very quickly.

While both the Thompson '107 series of patents and the '523 patent may have made progress in the theoretical technology of electrostatic filtration, there is still a need for an electrostatic filtration design that is not subject to arcing, resistance burns and/or the risk of fluid flow stoppage, caused by blinding (clogging) of any single layer of the filter media.

SUMMARY OF THE DISCLOSURE

This disclosure provides for an improved electrostatic filtration system for removing contaminants from a dielectric fluid that overcomes the arcing concerns, resistance burns and fluid flow concerns discussed above. The improved electrostatic filtration system has three major elements: an electrostatic filtration cartridge; an electrostatic filtration cartridge housing; and an electrostatic filtration system housing.

According to the present disclosure therefore there is provided an electrostatic filtration cartridge for removing contaminants from a dielectric fluid and comprising:
  at least one set m of conductive plates;
  at least one set of n conductive plates;
  the plates of the m and n sets being interleaved one with another and the plates of the m and n sets respectively being interconnected by conductive connector portions attached fast thereto; and
  a filter media disposed between each of the conductive plates.

It is within the electrostatic filtration cartridge where the apparatus and method for addressing the arcing concerns and fluid flow concerns reside. The electrostatic filtration cartridge includes at least one set of m conductive plates (m set) and at least one set of n conductive plates (n set). Within each of the sets (m set and n set) of conductive plates, the conductive plates are interconnected by a series of conductive connecting portions. A first end conductive plate of each set of conductive plates includes a conductive power connector to provide coupling to a high voltage coupling system. Within an n set: n may be equal to m; n may be equal to m+1; or n may be equal to m−1. The m and n sets of conductive plates are interleaved with each other.

At least one individual conductive plate within a first set of conductive plates includes a cutaway portion to avoid its electrical contact with an adjacent conductive connecting portion within a second set of conductive plates. At least one individual conductive plate within a second set of conductive plates includes a cutaway portion to avoid electrical contact with an adjacent conductive connecting portion within a first set of conductive plates. The m and n sets are formed from a single sheet of conductive material and are folded and placed within the electrostatic filtration cartridge so that the sets of conductive plates are in an interleaved position with respect to each other.

The number of conductive coupling portions within an m or n set is equal to m−1 or n−1. The number of filter media portions disposed between each of the interleaved conductive plates for collecting contaminants within the liquid to be cleaned, equals (m+n)−1.

The contaminated fluid is pumped to the electrostatic filtration cartridge within its cartridge housing and the contaminated fluid flows upward along an outer wall of the electrostatic filtration cartridge and in a parallel fashion, flows radially inwards away from the outer wall, through the electromagnetic field between each interleaved positively charged conductive plate and each interleaved negatively charged conductive plate and flows upwardly through a center opening of each conductive plate to a fluid output within a top non-conductive end piece. The contaminated fluid can travel through any one of the areas of filter media and not just the bottom. This allows the contaminated fluid to flow slower through each electromagnetic field and the contaminated fluid sits inside the charged field longer, thus allowing the contaminated fluid to take on a charge and be removed.

The sets of conductive plates with their interleaved filter media are advantageously held in place and coupled to a non-conductive top end piece and a non-conductive bottom end piece by one of more non-conductive rods.

The electrostatic filtration cartridge is preferably installed within a filtration cartridge housing that includes: a non-conductive protective barrier surrounding the electrostatic filtration cartridge; a pair of insulators that provides high voltage power and physical support for the electrostatic filtration cartridge; a fluid input that couples contaminated fluid to the electrostatic filtration cartridge; and a fluid output that couples processed fluid out of the electrostatic filtration cartridge housing.

The outside frame of the electrostatic filtration cartridge housing provides a cover to support the electrostatic filtration cartridge.

The filtration cartridge housing is installed within an electrostatic filtration system housing that includes: a high voltage power supply coupled to the electrostatic filtration cartridge housing; a contaminated fluid input coupled to one or more pump inputs; a contaminated fluid output to the electrostatic filtration cartridge housing; a processed fluid output coupled from the electrostatic filtration cartridge to the processed fluid output of the filtration system housing; a power connection on a frame of the filtration system housing to provide power to the one or more pumps; a cover; may have a plurality of wheels and a handle or skid; and various shut off valves and pressure measurement devices.

The method of removing contaminants from a dielectric fluid includes: pumping a contaminated fluid into the electrostatic filtration cartridge; guiding the contaminated fluid flow upwardly through a center opening of each conductive plate and each filter media portion towards a fluid output within a top non-conductive end piece; coupling a high voltage power supply to the sets of conductive plates creating at least one set of positively charged conductive plates and at least one set of negatively charged conductive plates;

creating an electromagnetic field within each filter media portion by charging the positively charged conductive plates and the negatively charged conductive plates; and removing processed fluid from the system.

BRIEF DESCRIPTION OF THE DRAWINGS

These and other features, aspects and advantages of the present disclosure will become better understood with regard to the following description, appended claims and accompanying drawings where:

FIGS. 2, 2a, 2b and 2c illustrate the prior art of the '523 patent;

FIGS. 5A, 5B, 5C and 5D illustrate an overall view of the four sides of a first exemplary embodiment of the electrostatic filtration cartridge;

FIGS. 15A-15D illustrate a first version of a second exemplary embodiment of the electrostatic filtration cartridge;

FIGS. 16A-16D illustrate a second version of a second exemplary embodiment of the electrostatic filtration cartridge;

FIGS. 17A-17D illustrate a third exemplary embodiment of the electrostatic filtration cartridge.

DETAILED DESCRIPTION OF THE PREFERRED EMBODIMENTS

Introduction

Figure 1:
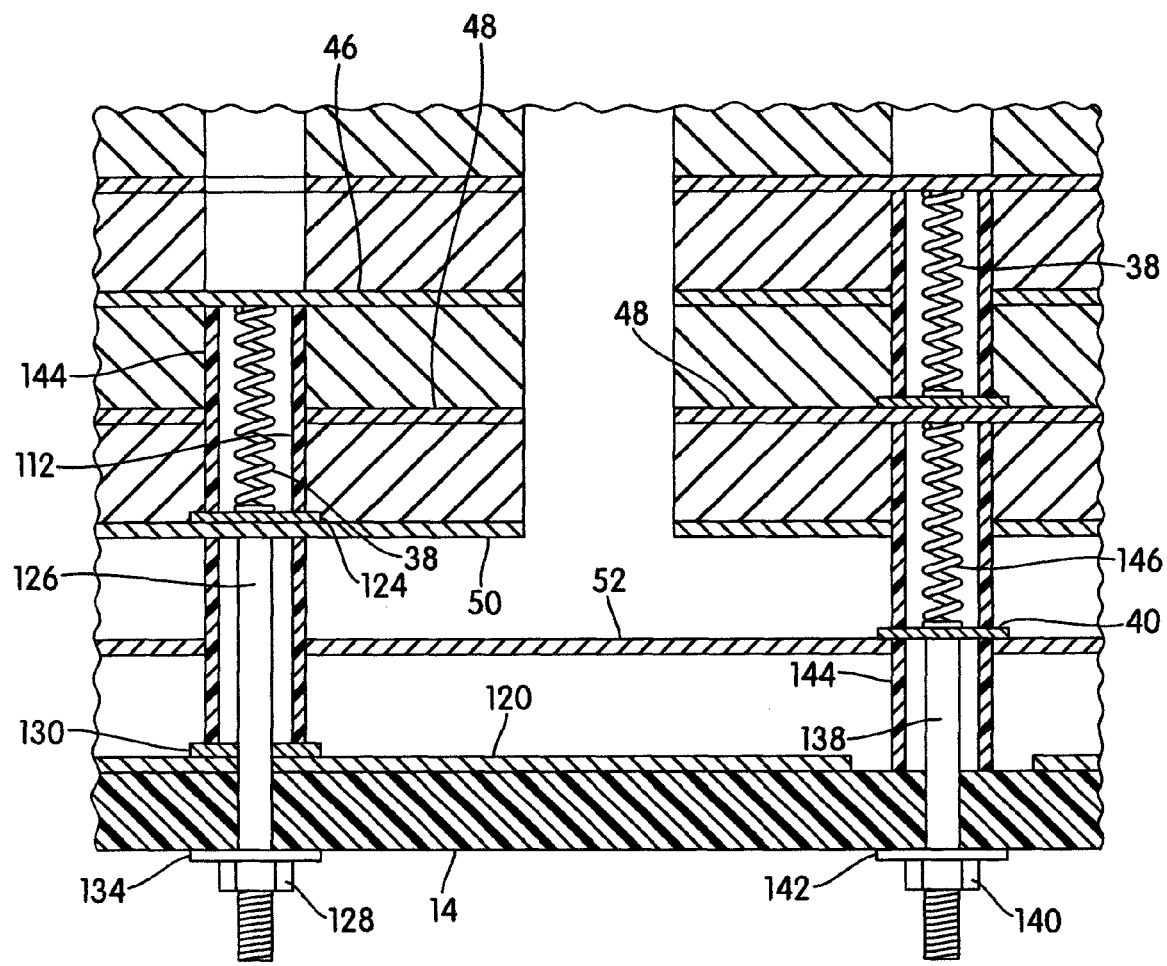
FIG. 1 illustrates the electrical contacting system used to maintain the alternating positive-negative voltage plates in an electrostatic filter from the '107 family of patents.

The electrostatic filtration system disclosed herein includes: an electrostatic filtration cartridge (cartridge) 100; an electrostatic filtration cartridge housing (cartridge housing) 102; and an electrostatic filtration system housing (system housing). Each of these disclosure elements may have multiple embodiments. Each of these disclosure elements will be discussed more fully below.

With regard to the cartridge 100, the common elements to all embodiments of the cartridge are: at least two sets of conductive plates with each plate within a first set of conductive plates interleaved with each plate within a second set of conductive plates; within a set of conductive plates the conductive plates are interconnected by at least one conductive coupling portion; the individual conductive plates are shaped to fit the configuration of the cartridge and to avoid electrical contact or arcing with the first set of conductive plates by the second set of conductive plates; an end plate of each set of conductive plates has a high voltage coupling system; in between each of the interleaved plates is a filter media portion for collecting contaminants within the liquid to be cleaned; a non-conductive top end piece and a non-conductive bottom end piece are coupled by one or more non-conductive rods that pass through one or more openings within the conductive plates and the filter media portions and are coupled at each end to the nonconductive top and non-conductive bottom; a fluid entrance area for the contaminated fluid sample to be cleaned and an exit port for the processed fluid. The cartridge is preferably mounted vertically. The cartridge may be circular in shape or may have a number of sides. The conductive plates, the filter material portions, and the end pieces are of equal diameter or size.

The size, numbers of conductive plates, thickness of the filter media portions, voltage level and the flow rate of the fluid are dependent upon the application and embodiment of the filtration system.

The cartridge housing 102 provides the housing for the cartridge 100. This includes: support for the cartridge 100, connection to a high voltage source, insulating material protecting the cartridge from conductive elements of the cartridge housing, a case (may be metallic); an input connection for contaminated dielectric fluid to be cleaned; an output for "cleaned" dielectric fluid; and a top mechanism that restricts the contaminated dielectric fluid to be cleaned and provides support of the cartridge to prevent movement of the cartridge within the cartridge housing.

The electrostatic filtration system housing includes: the cartridge housing 102, a high voltage source coupled to the cartridge housing; a fluid input system to the cartridge housing including one or more pumps, fluid flow measurement and control devices; a processed fluid output connection from the cartridge housing to a fluid output coupling on an outside case; an input fluid connection on the outside case that is coupled to the fluid input system; a power connection from the outside of the case to the high voltage source and the fluid input system; and the outside case which may have wheels and a handle for movement. The electrostatic filtration system housing may also be a skid platform supporting one or more of the items listed above. In addition to the items listed in the system housing, a water removal system and a barrier filter may be included depending upon the application for the system.

Detailed Description of a First Exemplary Embodiment of the Electrostatic Filtration Cartridge Several exemplary embodiments of the electrostatic filtration cartridge (cartridge) 100 described below are part of an improved electrostatic filtration system, as discussed above. The improved electrostatic filtration system includes three major elements: the electrostatic filtration cartridge 100; an electrostatic filtration cartridge housing 102; and an electrostatic filtration system housing.

Figure 3:
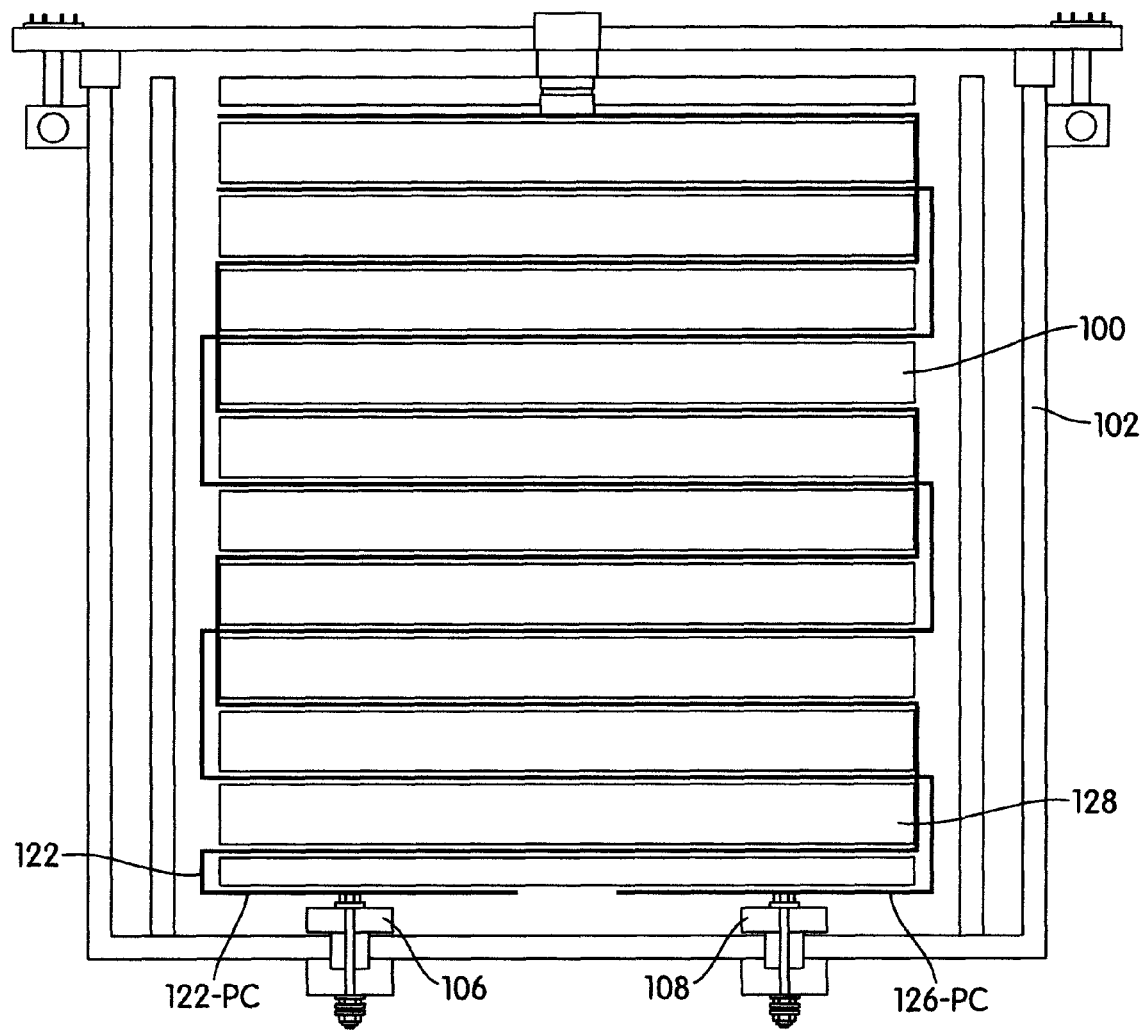
FIG. 3 illustrates a conceptual illustration of the instant electrostatic filtration cartridge within its filtration housing.
Figure 4C:
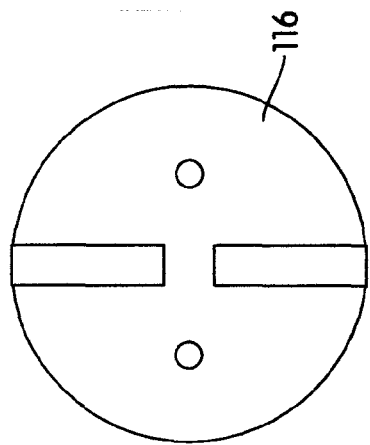
FIGS. 4A, 4B, 4C and 4D illustrate the non-conductive top and bottom elements of the electrostatic filtration cartridge.
Figure 4B:
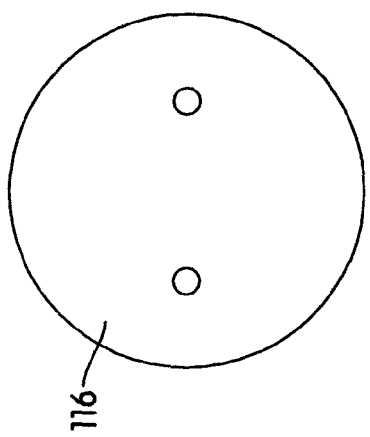
Figure 4A:
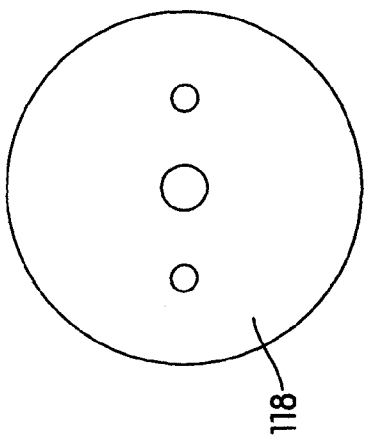
Figure 4D:
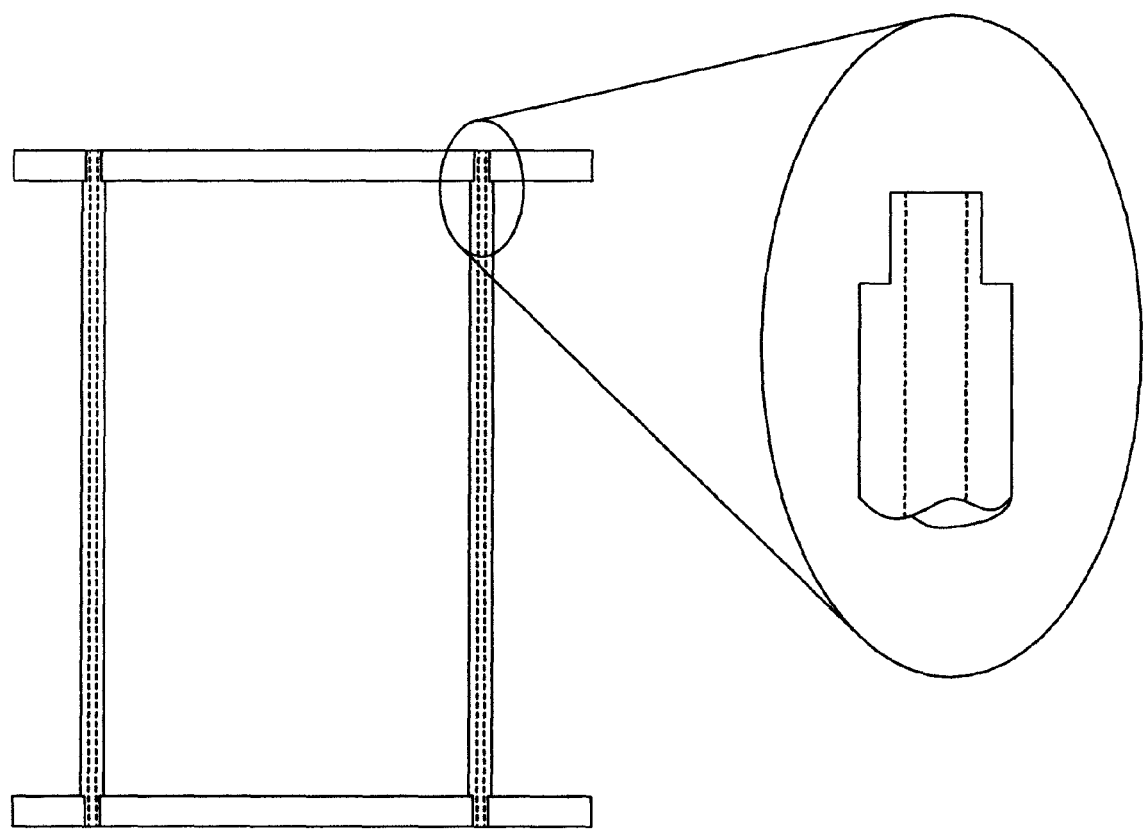
Figure 6:
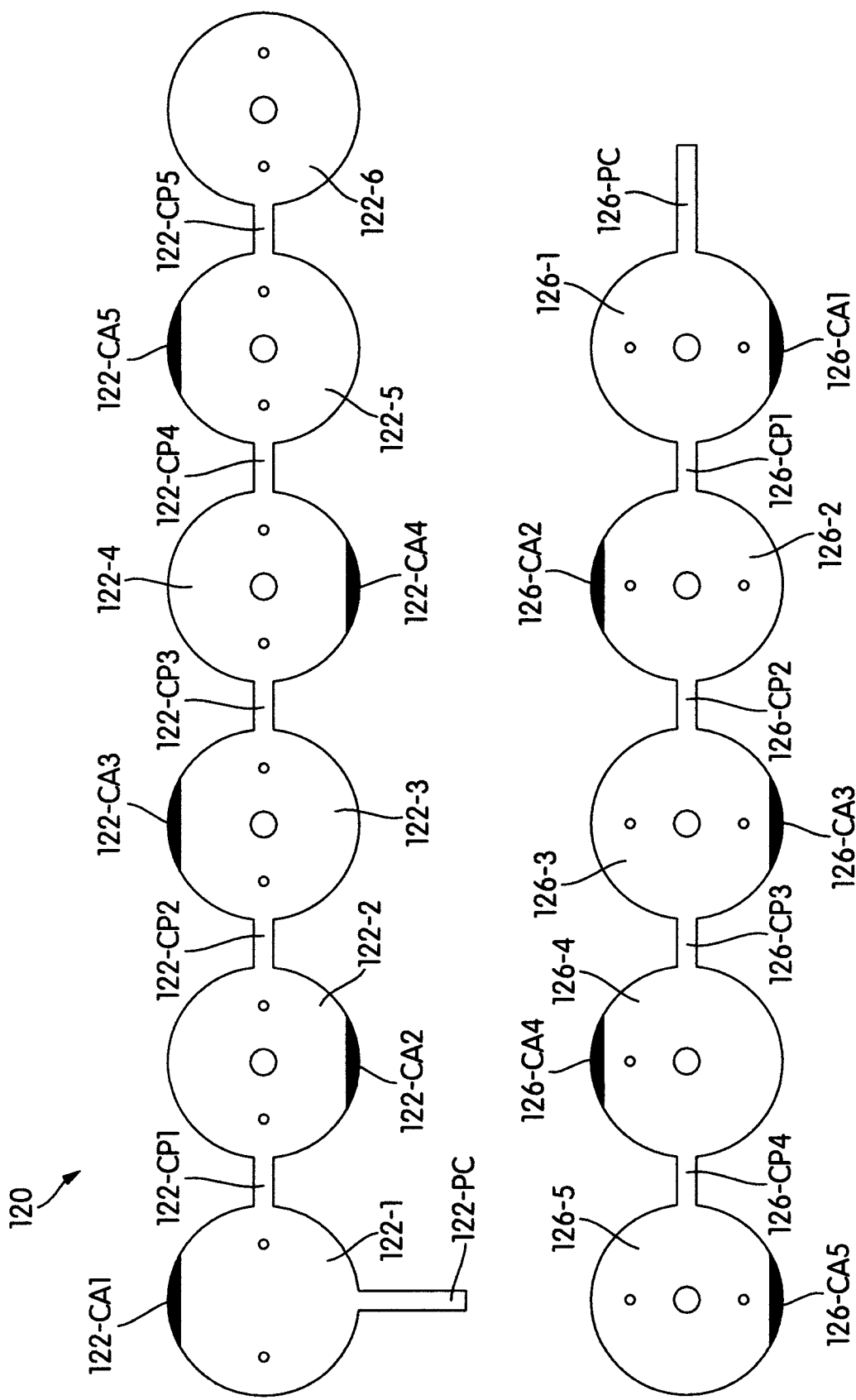
FIG. 6 illustrates the pair of electrostatic conductive plates of the first exemplary embodiment of the electrostatic filtration cartridge.

A first exemplary embodiment of an improved electrostatic filtration cartridge 100 is illustrated in FIG. 3, a conceptual illustration of the electrostatic filtration cartridge 100 within its cartridge housing 102. The electrostatic filtration cartridge 100 is supported on its bottom by a first insulated electrode 106 and a second insulated electrode 108. Each insulated electrode 106 and 108 is coupled to each set of conductive plates via a pair of conductive power connectors 122PC and 126PC. The bottom of the cartridge 100 is supported by a bottom non-conductive end piece 116 as illustrated in FIG. 4B and the top end of the cartridge 100 is supported by a top nonconductive end piece 118 as illustrated in FIG. 4C. The top end piece 118 and the bottom end piece are coupled through the conductive plates and filter media portions by a set of rods as illustrated by FIG. 4D. In this first exemplary embodiment, as illustrated in FIG. 5, one set of plates 120 is a set of six conductive plates 122-1 through 122-6. A second set of plates 124 is a set of five conductive plates 126-1 through 126-PC. Each set of plate consists of a single piece of conductive material folded over to create one positive set of plates and one negative set of plates when connected to a high voltage source. When coupled to the high voltage source these interleaved plates create electromagnetic fields that charge polar sub-micron varnish molecules and particles. FIG. 6 illustrates the two sets of conductive plates in an unfolded state of this first exemplary embodiment. The plurality of horizontal bands of filter media 128 provide the filtration process by removing sub-micron particles while the newly cleaned oil passes through the electrostatic filtration cartridge 100. The plurality of vertical bands called conductive coupling portions 122-CP1 through 122-CP6 and 126-CP5 are portions of the sets of conductive plates 120 and 122 that conduct the electrical signal to the conductive plates 122-1 through 122-6 and 126-1 through 126-6 discussed above. In between each band of filter media portions 128 is a conductive plate 122 or 126. The use of six conductive plates in the first set and five conductive plates in the second set illustrated in this first exemplary embodiment while arbitrarily set for illustration, are in conformance with certain guidelines that need to be followed in each embodiment of the cartridge 100.

FIG. 6 illustrates the two sets of plates discussed above. The plates consist of a single piece of conductive material folded over to create one positive set of plates and one negative set of plates. Each set has a number of conductive plates connected by a conductive coupling portion to connect every other plate with a band (that is visible as shown in FIGS. 3, 5 and 6). Each set of conductive plates also has a connecting portion on a first end conductive plate 122-1 and 126-1 to provide a connecting means to connect the set of plates to the voltage source (to be discussed further below). Conductive plates 122-1 through 122-5 and 126-1 through 126-5 have a cutaway portion positioned so that the location of the cutaways alternate from one side of the cartridge to the other as illustrated in FIG. 5. The purpose of the cutaway will be discussed in more detail below. All but the bottom conductive plate has a center opening to allow the processed fluid to flow upward out of the cartridge. In this exemplary embodiment, a first set of plates 120 has an even number of plates 122 and the other set of plates 124 has an odd number of plates 126. The first set of plates with an even number of conductive plates 122 includes: the one plate with no center opening; its power connector 122-PC on the side opposite of its first cutaway 122-CA1. The set of plates with the even number of plates 120 has its power connector at the end of the first conductive plate 122-1. The set of plates with the odd number of plates 124 has its power connector at the end of the first conductive plate 126-1. This structure of the plates is a significant contribution to solving the arcing problem discussed with regards to the prior art. The use of these sets of plates makes the installation and replacement of the filter media portions easier than in the prior art.

FIGS. 7-14 illustrate details of a first exemplary embodiment of the electrostatic filtration cartridge 100. FIGS. 7-10 illustrate details Sides A-D (arbitrarily established for illustration and discussion) as illustrated in FIG. 6. FIGS. 11-14 illustrate: the area between the center of Side A to the center of Side B; the area between the center of Side B to the center of Side C; the area between the center of Side C to the center of Side D; and the area between the center of Side D to the center of Side A. The first exemplary embodiment of electrostatic filtration cartridge (cartridge) 100 as illustrated in FIGS. 7-14 is a circular device. However, non-circular embodiments are feasible. Each of these views is what an observer would be seeing when observing straight on to the cartridge 100. A reference to a left side, middle or right side in each description is related to how an observer would see the element in that view. Within this first exemplary embodiment there are 12 levels separated by a conductive plate 122 or 126. There are two sets of conductive plates 120 and 124. The first set includes an exemplary value of six conductive plates 122-1 through 122-6 and is called the "even" set throughout the discussion of the first exemplary embodiment. The second set includes an exemplary value five conductive plates 126-1 through 122-5 is called the "odd" set throughout the discussion of the first exemplary embodiment. The 12 levels include an exemplary value of 10 levels of filter media portions 1281 through 128-10 and a top non-conductive end piece 118 and a bottom non-conductive end piece 116. Within these levels there is a plurality of conductive coupling portions CP between the conductive plates 122 or 126 as shown in FIG. 6. As will be discussed, this first exemplary embodiment is illustrative of the structure in all the other embodiments and this disclosure is not limited to this first exemplary embodiment.

Detailed Description of Side A of the Cartridge

Figure 7:
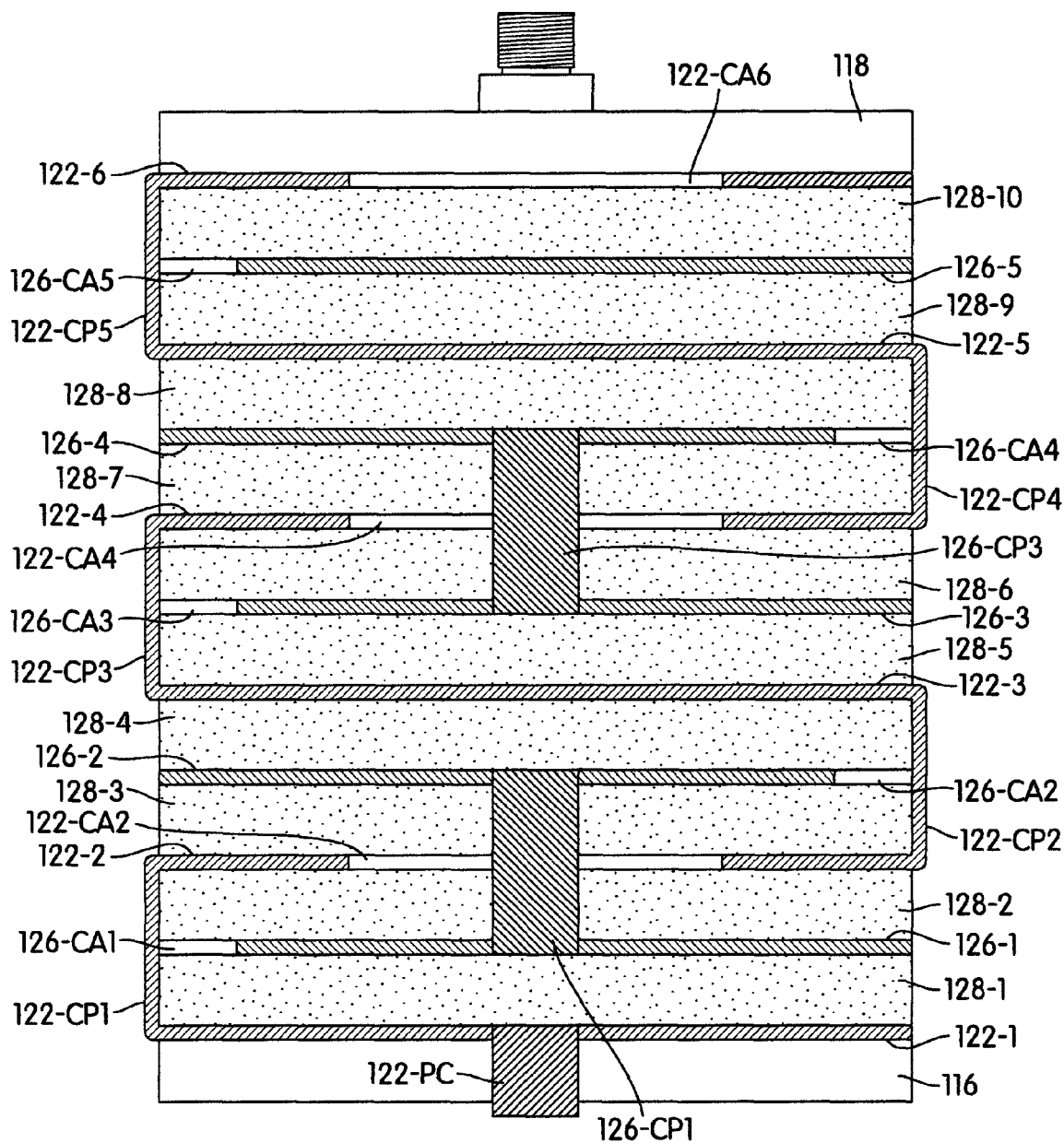
FIG. 7 illustrates a detailed view of side A of a first exemplary embodiment of the electrostatic filtration cartridge.

FIG. 7 illustrates Side A of the first exemplary embodiment of the electrostatic filtration cartridge 100. Side A is counterclockwise from Side B and opposite Side C.

The first conductive plate 122-1 of the set of plates having an even number (m) of plates 120 lies on top of the non-conductive bottom end piece 116 and is coupled to the first power connector 122-PC that wraps around a portion of the circumference of the non-conductive bottom end piece 116 as also illustrated in FIG. 5A. The first conductive coupling portion 122-CP1 is coupled on the first end to the left side of the first conductive plate 122-1. The second end of the first conductive coupling portion 122-CP1 is coupled to the left side of the second conductive plate 122-2. The second conductive coupling portion 122-CP2 couples the right hand portion of the second conductive plate 122-2 to the right hand portion of the third conductive plate 122-3. The left hand side of the third conductive plate 122-3 is coupled to the first end of the third conductive coupling portion 122-CP3. The second end of the third conductive coupling portion 122-CP3 is coupled to the left side of the fourth conductive plate 122-4. The right side of the fourth conductive plate 122-4 is coupled to the first end of the fourth conductive coupling portion 122-CP4. The second end of the fourth conductive coupling portion 122-CP4 is coupled to right side of the fifth conductive plate 122-5. The left side of the fifth conductive plate 122-5 is coupled to the first end of the fifth conductive coupling portion 122-CP5.

The second end of the fifth conductive coupling portion 122-CP5 is coupled to the left side of sixth and final conductive plate 122-6 in this "even" set of conductive plates. The above has been a description of the location and placement of the elements of the "even" set of plates 120.

A description of the location and placement of the conductive plates of the "odd" set of (n) plates 124 that are interleaved with the "even set" of plates described above, follows below. It should be noted that ten layers of filter media portions 128-1 through 128-10 are placed in between the pairs of conductive plates. This filter media portion provides for the filtering process and also provides the physical separation of the conductive plates of one set of conductive plates from the conductive plates from the other set of conductive plates with these two sets being connected to opposite polarities of the HV voltage power supply. The details of the structure of the layers of filter media portions are discussed below.

The placement of the "odd set" of plates 124 including the odd number (n) of conductive plates 126 begins with the placement of the first conductive plate 126-1 on to the top of the first layer of filter media portions 128-1. The first end of a first conductive coupling portion 126-CP1 is coupled to the middle of the first conductive plate 126-1. The second end of the first conductive coupling portion 126-CP1 is coupled to the middle of the second conductive plate 1262. The first end of a second coupling plate 126-CP2 is coupled to the middle of a second conductive plate 126-2 (on the other side of 126-2 and is visible in Side C—FIG. 9). The second end of the second coupling plate 126-CP2 is coupled to the middle of a third conductive plate 126-3 (on the other side of 126-3 and is visible in Side C—FIG. 9). The middle of the third conductive plate 126-3 is coupled to the first end of the third conductive coupling portion 126-CP3. The second end of the third conductive coupling portion 126-CP3 is coupled to middle of the fourth conductive plate 126-4. The middle of other side of the fourth conductive plate 126-4 is coupled to the first end of the fourth conductive coupling portion 126-CP4 (visible in Side C—FIG. 9). The second end of the fourth conductive coupling portion 126-CP4 is couple to the middle of the other side of the fifth and final conductive plate 126-5 of "odd" set of conductive plates (visible in Side C—FIG. 9).

As can be observed from FIG. 7 the elements of this first exemplary embodiment of electrostatic filtration cartridge 100 includes: six conductive "even" set plates 122-1-122-6 interweaved with five conductive "odd" set plates 126-1-126-5; ten pieces of filter media portions in between each conductive plate; a top non-conductive end piece 116; and a bottom nonconductive end piece 118.

As shown in FIG. 6 each conductive plate 122-1 through 122-6 and 126-1 through 126-5 has a cutaway portion in order to avoid having an "even" set conductive plate 122-1-1226 making contact with an "odd set" conductive plate 126-1 through 126-5. Within FIGS. 7-14 these cutaway portions 122-CA1 through 122-CA-5 and 126-CA1 through 126-CA5 (the sixth conductive plate 122-6 does not need a cutaway because the sixth conductive plate 122 cannot be in contact with an "odd" set conductive plate) as illustrated by a clear area (not hatched) to represent the cutaway area of each conductive plate. Within Side A as illustrated in FIG. 7, cutaways are visible for the second conductive plate 122-2, 122-CA2, and the fourth conductive plate 122-4, 122-CA4, for the conductive plates within the "even" set of conductive plates. The cutaways are visible for the first conductive plate 126-1, 126-CA1, the second conductive plate 126-2, 126-CA2, the third conductive plate 126-3, 126-CA3, the fourth conductive plate 126-4, 126-CA4 and fifth conductive plate 126-5 for the conductive plates within the "odd" set of conductive plates.

Detailed Description of Side B of the Cartridge

Figure 8:
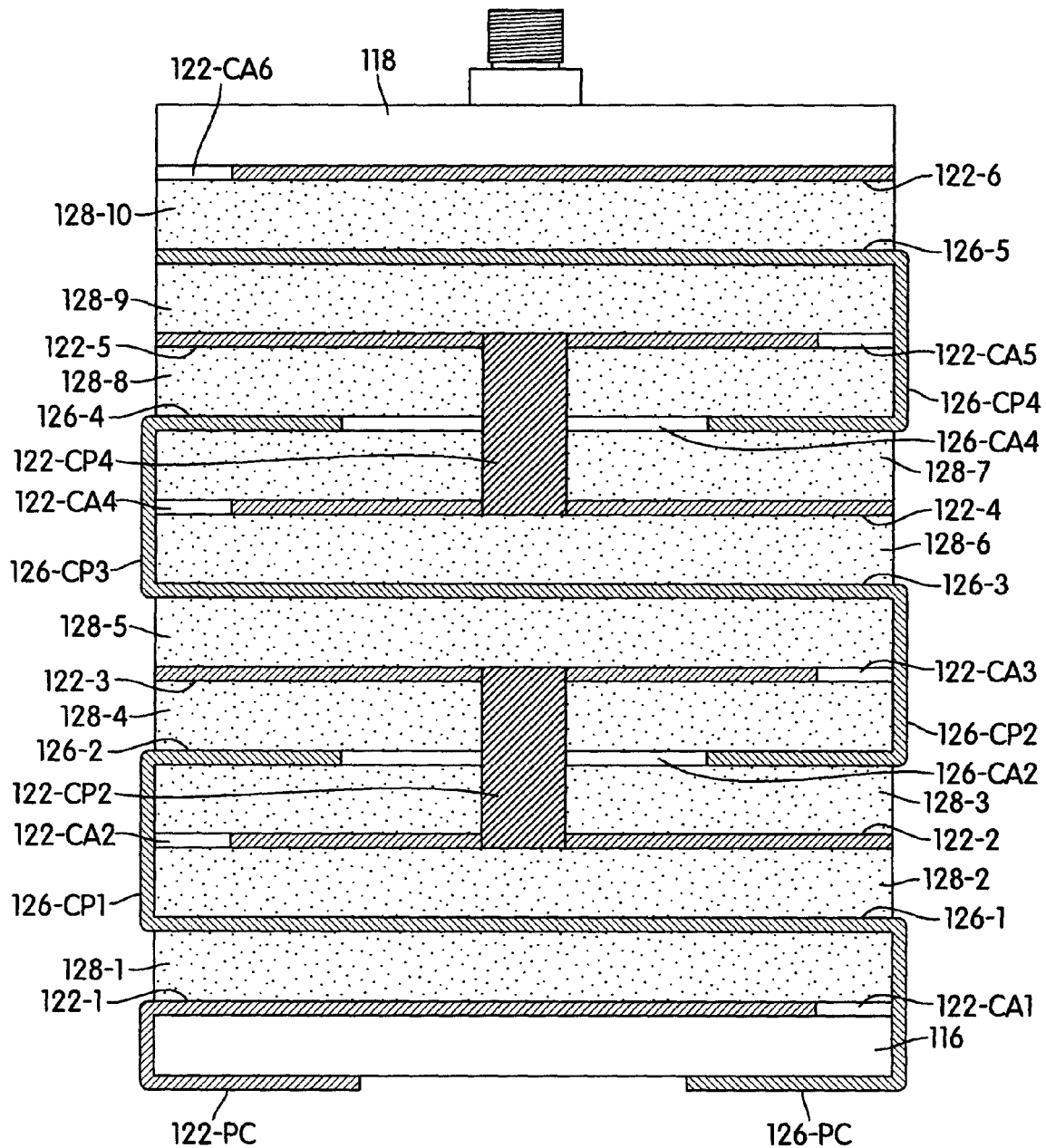
FIG. 8 illustrates a detailed view of side B of a first exemplary embodiment the electrostatic filtration cartridge.

FIG. 8 illustrates Side B of the first exemplary embodiment of the electrostatic filtration cartridge 100. Side B is counterclockwise from Side A and opposite Side D.

In Side B the first conductive plate 122-1 of the set of conductive plates having an even number of plates ("even" set) 120 lies on top of the non-conductive bottom end piece 116 and is coupled to the first power connector 122-PC that wraps around a portion of the circumference of the bottom end piece 116. The first conductive plate 122-1 and the second conductive plate 122-2 are coupled together by the first conductive coupling portion 122-CP1 located at the middle of on the opposite side of the first conductive plate 122-1 and located at the middle of on the opposite side of the second conductive plate 122-2 as illustrated as part of Side D and FIG. 10. The first end of a second conductive coupling portion 122-CP2 is coupled to the middle of conductive plate 122-2. The second end of the second conductive coupling portion 122-CP2 is coupled to the middle of conductive plate 122-3. The third conductive plate 122-3 and the fourth conductive plate 122-4 are coupled together at their midpoints by the third conductive coupling portion 122-CP3 located at the middle on the opposite side of the third conductive plate 122-3 and the fourth conductive plate 122-4 as illustrated as part of Side D in FIG. 10. The first end of the fourth conductive coupling portion 122-CP4 is coupled to the middle portion of the fourth conductive plate 122-4. The second end of the fourth conductive coupling portion 122-CP4 is coupled to the middle portion of the fifth conductive plate 122-5. The fifth conductive plate 122-5 and a sixth conductive plate 122-6 are coupled together at their midpoints by the fifth conductive coupling portion 122-CP5 located on the opposite side of the fifth conductive plate 122-5 and sixth conductive plate 122-6 and is illustrated as part of Side D in FIG. 10.

The placement of the "odd" set 124 including the odd number of conductive plates 126 begins with the second power connector 126-PC that wraps around a portion of the circumference of the bottom end piece 116 and is coupled to the right hand side of the first conductive plate 126-1. The first conductive plate 126-1 and the second conductive plate 126-2 are coupled together by a first conductive coupling portion 126-CP1 located on the left hand side of the first conductive plate 126-1 and the second conductive plate 126-2. The second conductive plate 126-2 is coupled to a first end of the second conductive coupling portion 126-CP2 at the right side of the second conductive plate 126-2. The second end of the second conductive coupling portion 126-CP2 is coupled to the right side a third conductive plate 126-3. The third conductive plate 126-3 and the fourth conductive plate 126-4 are coupled together by a third conductive coupling portion 126-CP3 located on the left side of the third conductive plate 126-3 and the fourth conductive plate 126-4. The first end of the fourth conductive coupling portion 126-CP4 is coupled to the right side of the fourth conductive plate 126-4. The second end of the fourth conductive coupling portion 126-CP4 is coupled to right side of the fifth and last conductive plate 126-5 of the "odd" set.

As can be observed from FIG. 8 the elements of the electrostatic filtration cartridge 100 include: six conductive "even" set plates 122-1-122-6 interweaved with five "odd" set plates 126-1-126-5; ten pieces of filter media portions 128-1 through 128-10 in between each conductive plate; the top non-conductive end piece 118; and the bottom non-conductive end piece 116.

Within Side B cutaways are visible for the first conductive plate 122-1, 122-CA1, the second conductive plate 122-2, 122-CA2, the third conductive plate 122-3, 122-CA3, the fourth conductive plate 122-4, 122-CA4, and the fifth conductive plate 122-5, 122-CA5, for the conductive plates within the "even" set of conductive plates. The cutaways are visible for the second conductive plate 126-2, 126-CA2, and the fourth conductive plate 126-4, 126-CA4 for the conductive plates within the "odd" set of conductive plates.

Detailed Description of Side C of Cartridge

Figure 9:
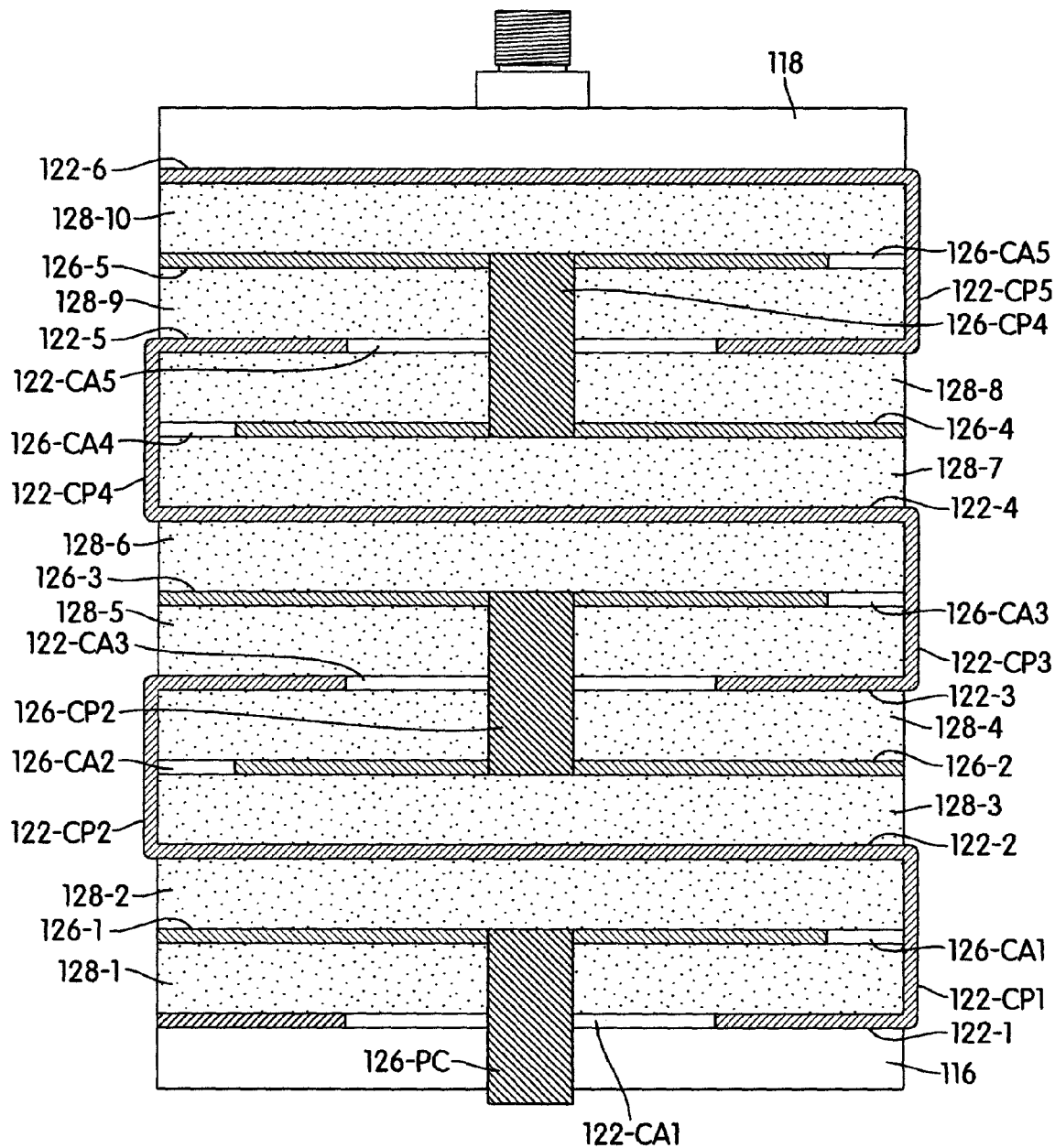
FIG. 9 illustrates a detailed view of side C of a first exemplary embodiment the electrostatic filtration cartridge.

FIG. 9 illustrates Side C of the first exemplary embodiment of the electrostatic filtration cartridge 100. Side C is counterclockwise from Side B and opposite to Side A.

The first conductive plate 122-1 of an "even" set of conductive plates 120 having an even number of conductive plates 122 lies on top of the bottom end piece 116 and is coupled on the first conductive coupling portion 122-CP1 is coupled to the right side of the second conductive plate 122-2. The left side of the second conductive plate 122-2 is coupled to the first end of the second conductive coupling portion 122-CP2. The second end of the second conductive coupling portion 122-CP2 is coupled to the left side of the third conductive plate 122-3. The right end of the third conductive plate 122-3 is coupled to the first end of the third conductive coupling portion 122-CP3. The second end of the third conductive coupling portion 122-CP3 is coupled to the right end of the fourth conductive plate 122-4. The left end of the fourth conductive plate 1224 is coupled to the first end of the fourth conductive coupling portion 122-CP4. The second end of the fourth conductive coupling portion 122-CP4 is coupled to the left end of the fifth conductive plate 122-5. The right end of the fifth conductive plate 122-5 is coupled to the first end of the fifth conductive coupling portion 122-CP5. The second end of the fifth conductive coupling portion 122-CP5 is coupled the right end of the sixth and final conductive plate 122-6 of the "even" set of conductive plates. The above has been a description of the location and placement of the elements of the "even" set of plates 120 as viewed from the C side. The location and the placement of the elements of the "odd" set of plates that are interleaved with the "even" set is described below. It should be noted that layers of filter media portions are placed in between the conductive plates. The details of the structure of the filter media portions are discussed below.

The placement of the "odd" set 124 as illustrated within Side C including the odd number of conductive plates 126 begins with the "odd" set power connector 126-PC that wraps around a portion of the circumference of the bottom end piece 116 as also illustrated in FIG. 5C and is coupled to the middle of third first conductive plate 126-1.

The first conductive plate 126-1 and the second conductive plate 126 2 are coupled together by the first conductive coupling portion 126-CP1 located on the opposite side of the first conductive plate 126-1 and the second conductive plate as illustrated in Side A in FIG. 7. The second conductive plate 126-2 is coupled to the first end of the second conductive coupling portion 126-CP2 at middle of the second conductive plate 126-2. The second end of the second conductive coupling portion 126-CP2 is coupled to the middle of the third conductive plate 126-3. The third conductive plate 126-3 and third a fourth conductive plate 126-4 are coupled together by the third conductive coupling portion 126-CP3 located on the opposite side of the third conductive plate 126-3 and the fourth conductive plate as illustrated in Side A in FIG. 7. The first end of the fourth conductive coupling portion 126-CP4 is coupled to the middle of the fourth conductive plate 126-4. The second end of the fourth coupling portion 126-CP4 is coupled to the middle of the fifth and last conductive plate 126-5 within the "odd set' of conductive plates.

As can be observed from FIG. 9 the elements of this first exemplary embodiment of the electrostatic filtration cartridge 100 includes: six "even" set conductive plates" 122-1-1226 interweaved with five "odd" set conductive plates 126-1 126-5; ten pieces of filter media portions each piece in between the conductive plates; the top non-conductive end piece 118; and the bottom insulated non-conductive end piece 116.

Detailed Description of Side D of the Cartridge

Figure 10:
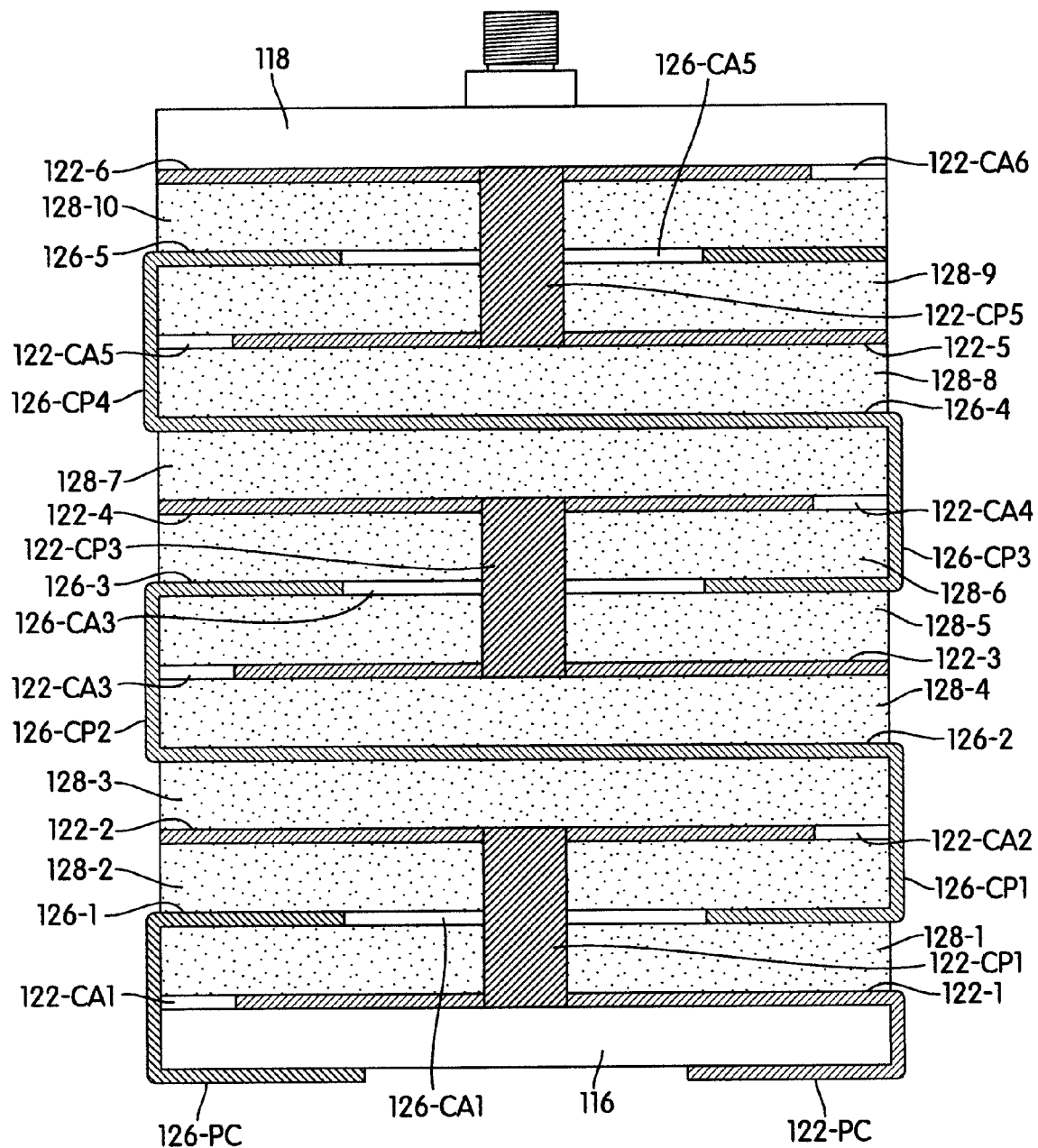
FIG. 10 illustrates a detailed view of side D of a first exemplary embodiment the electrostatic filtration cartridge.

FIG. 10 illustrates Side D of the first exemplary embodiment of the electrostatic filtration cartridge 100. Side D is counterclockwise from Side C and opposite to Side B.

The first conductive plate 122-1 of the set of conductive plates having an even number of plates 120 lies on top of the bottom end piece 116 and is coupled to the first power connector 122-PC that wraps around a portion of circumference of the bottom end piece 116 as also illustrated in FIG. 5A. The first conductive coupling portion 122-CP1 is coupled on a first end to the middle of the first conductive plate 122-1. The second end of the first conductive coupling portion 122-CP1 is coupled to the middle of the second conductive plate 122-2. The second conductive coupling portion 122-CP2 couples the middle portion of the opposite side of second conductive plate 122-2 to the middle portion of the opposite side of the third conductive plate 122-3 as is visible in Side B—FIG. 8. The middle of the third conductive plate 122-3 is coupled to the first end of the third conductive coupling portion 122-CP3. The second end of the third conductive coupling portion 122-CP3 is coupled to the middle of conductive plate 122-4. The fourth conductive coupling portion 122-CP4 couples the middle portion of the opposite side of the fourth conductive plate 122-4 to the middle portion of the opposite side of the fifth conductive plate 122-5 as is visible in Side B—FIG. 8. The middle of the fifth conductive plate 122-5 is coupled to the first end of a fifth conductive coupling portion 122-CP5. The second end of the fifth conductive coupling portion is coupled to the middle of sixth and final conductive plate 122-6 of the "even" set of conductive plates 120. The above has been a description of the location and placement of the elements of the "even" set of plates 120.

A description of the location and placement of the elements of the "odd" set of plates that are interleaved with the "even set" as described above follows below. It should be noted that the layers of filter media portions are placed in between the conductive plates. The details of the structure of the filter media portions are discussed below.

The placement of the "odd" set 124 including the odd number of plates 126 begins with the second power connector 126-PC that wraps around a portion of the circumference of the bottom end piece 116 as also illustrated in FIG. 5C and is coupled to the first conductive plate 126-1.

The placement of the "odd" set of plates 126 begins with the placement of the first conductive plate 126-1 on to the top of the first layer of filter media portions 128-1. The first end of the first conductive coupling portion 126-CP1 is coupled to the right side of the first conductive plate 126-1. The second end of the first conductive coupling portion 126-CP1 is coupled to the right side of the second conductive plate 126-2. The first end of a second conductive coupling portion 126-CP2 is coupled to the left side of the second conductive plate 126-2. The second end of the second conductive coupling plate 126-CP2 is coupled to the left side of the third conductive plate 126-3. The right side of the third conductive plate 126-3 is coupled to the right side of the fourth conductive plate 126-4 by the third conductive coupling portion 126-CP3. The left side of the fourth conductive plate 126-4 is coupled to the fifth and final conductive plate 126-5 by the fifth conductive coupling portion 126-CP4 of the "odd" set of conductive plates 124.

As can be observed from FIG. 10 the elements of this first exemplary embodiment of the electrostatic filtration cartridge 100 includes: six conductive "even" set plates 122-1-1226 interweaved with five "odd" set plates" 126-1-126-5; ten pieces of filter media portion each piece in between each conductive plate.

Description of Views in Between Sides of Cartridge

Figure 12:
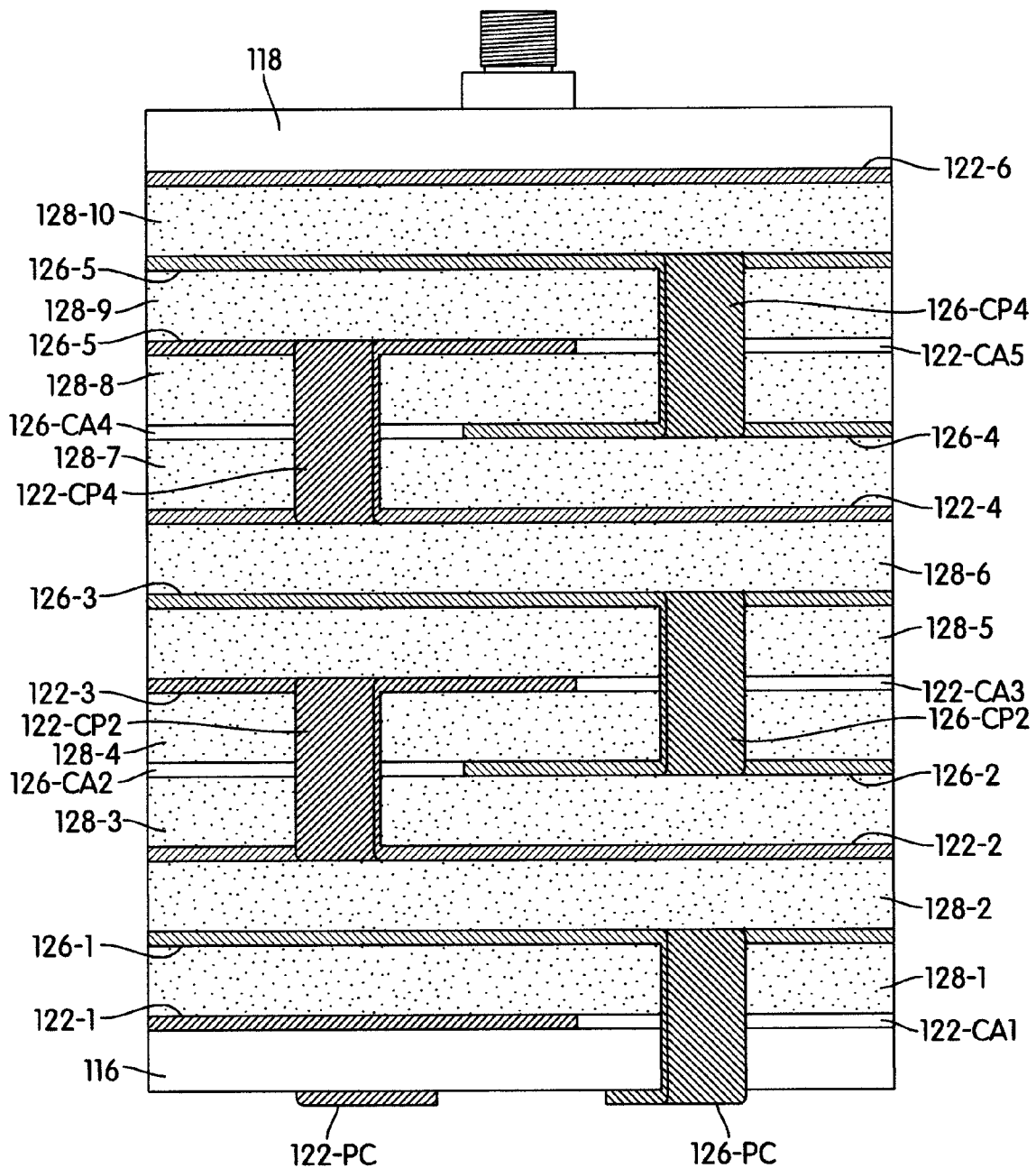
FIG. 12 illustrates a detailed view of the area between sides B and C of a first exemplary embodiment the electrostatic filtration cartridge.
Figure 13:
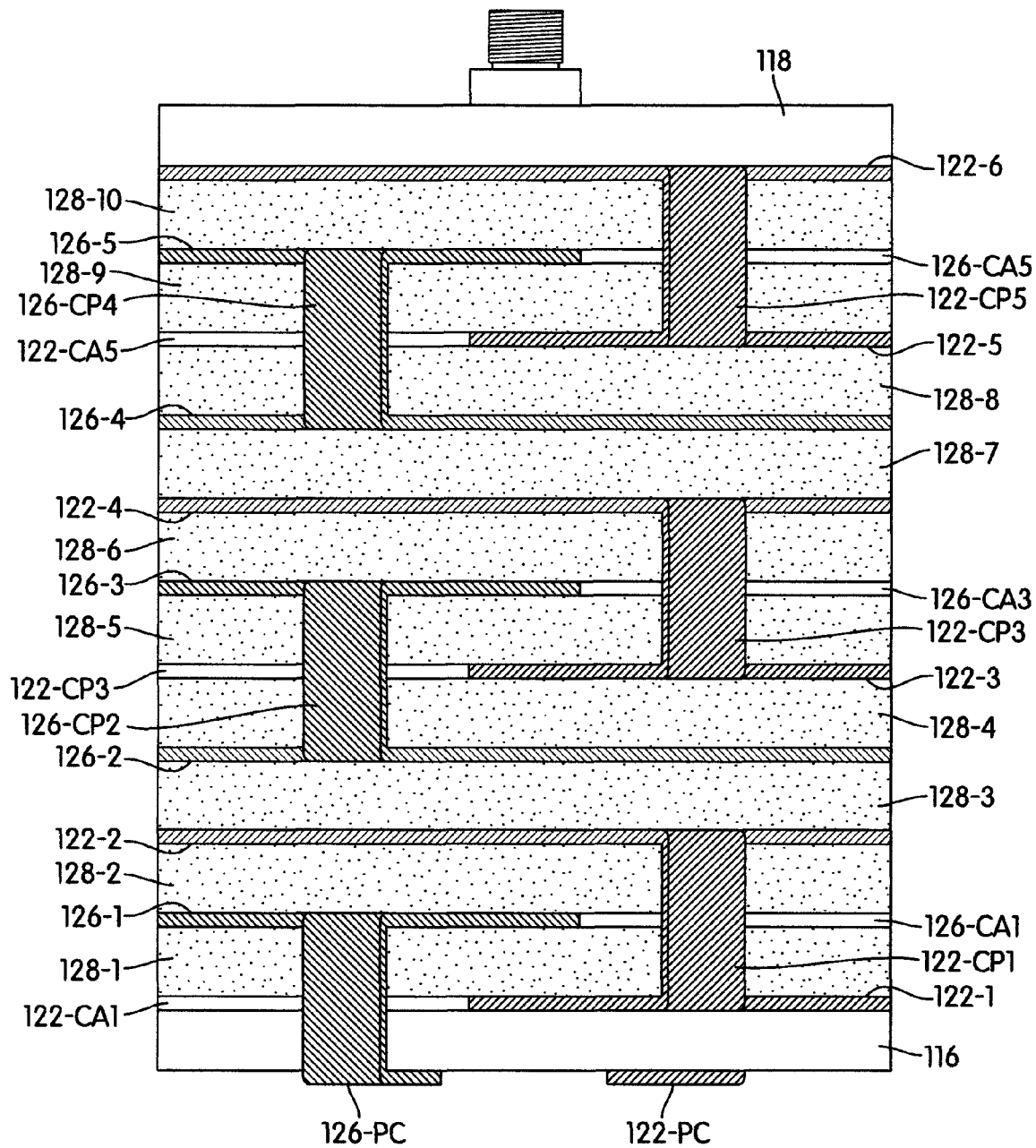
FIG. 13 illustrates a detailed view of the area between sides C and D of a first exemplary embodiment the electrostatic filtration cartridge.
Figure 14:
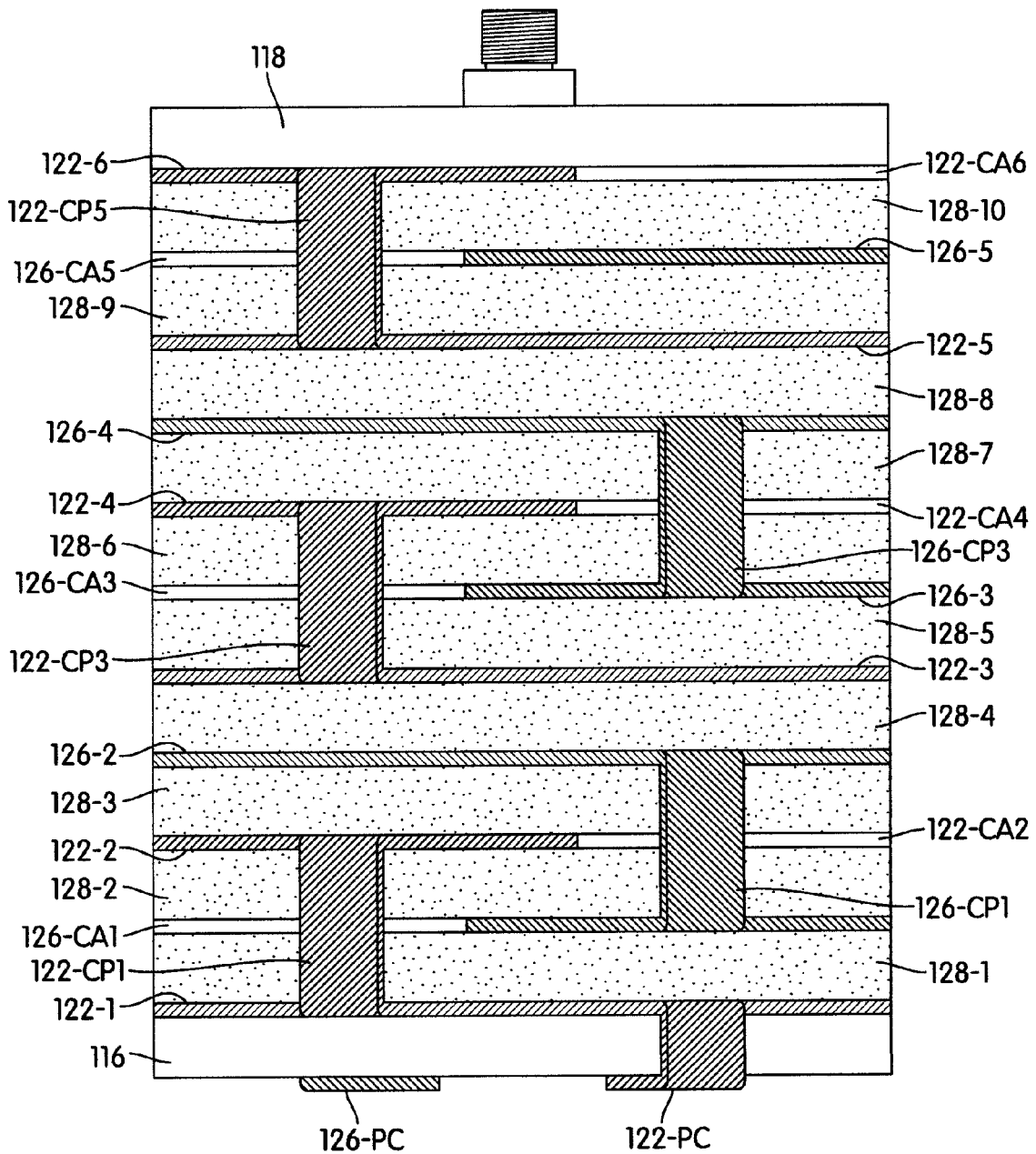
FIG. 14 illustrates a detailed view of the area between sides D and A of a first exemplary embodiment the electrostatic filtration cartridge.
Figures 16A, 16B:
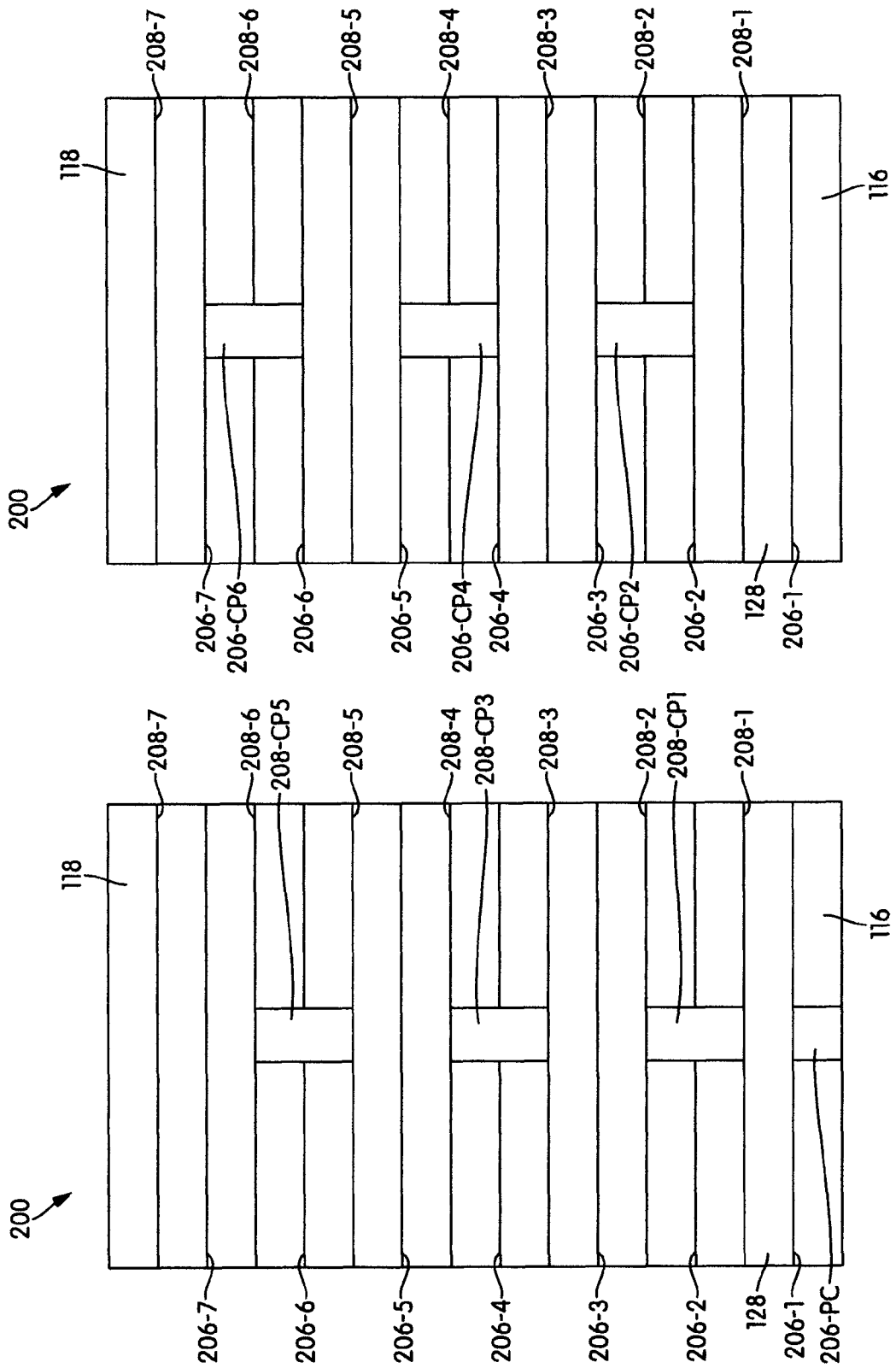
Figures 17C, 17D:
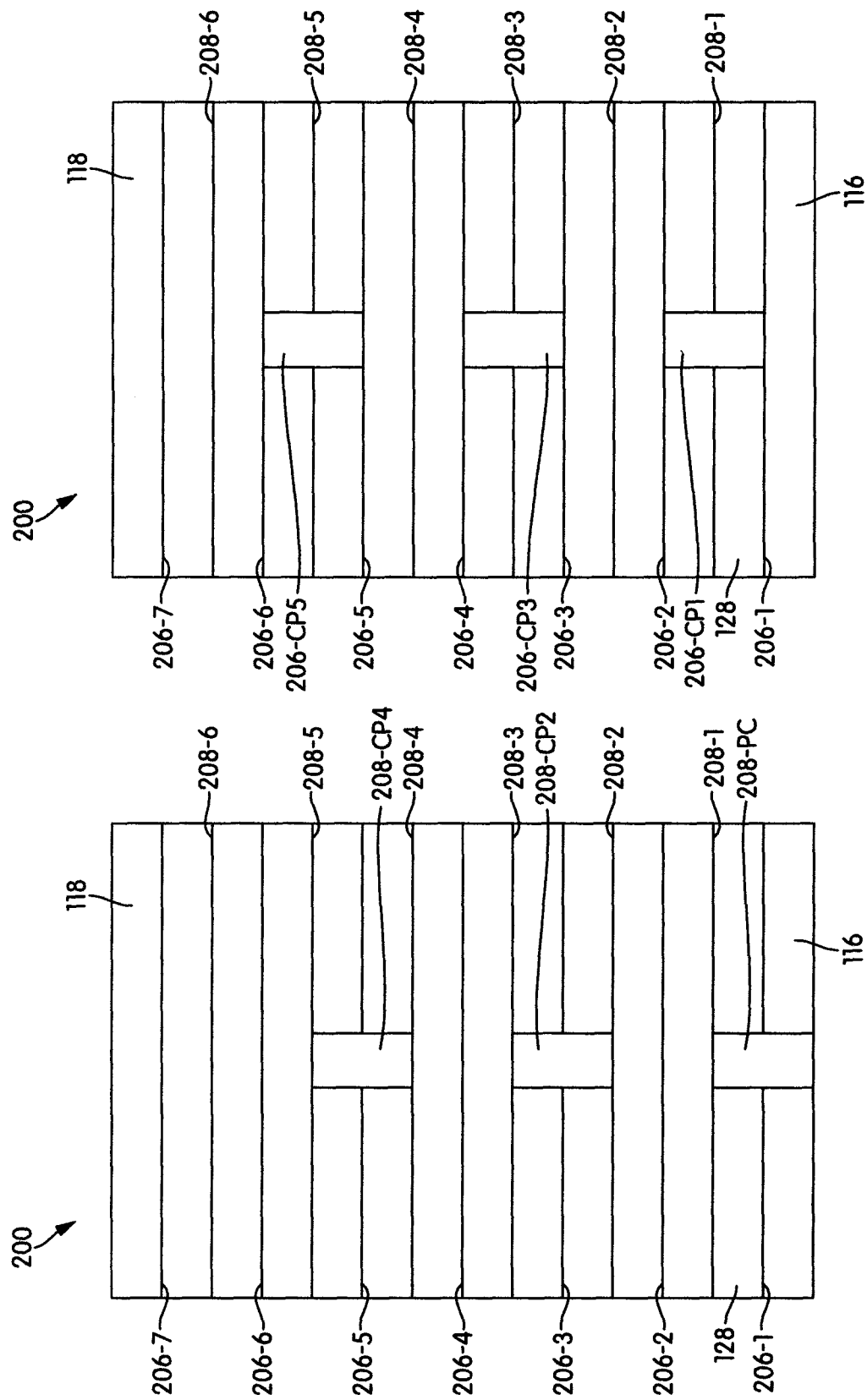

FIGS. 11-14 illustrate views of this first exemplary embodiment of electrostatic filtration cartridge 100 from a position between Sides A and B (FIG. 11); between Sides B and C (FIG. 12) between Sides C and D (FIG. 13); and between Sides D and A (FIG. 14). These additional figures help further clarify the relationship of the conductive coupling portions of the sets of conductive plates with regard to the individual conductive plates and the sets of conductive plates with each other.

View Between Sides A and B of the Cartridge

Figure 11:
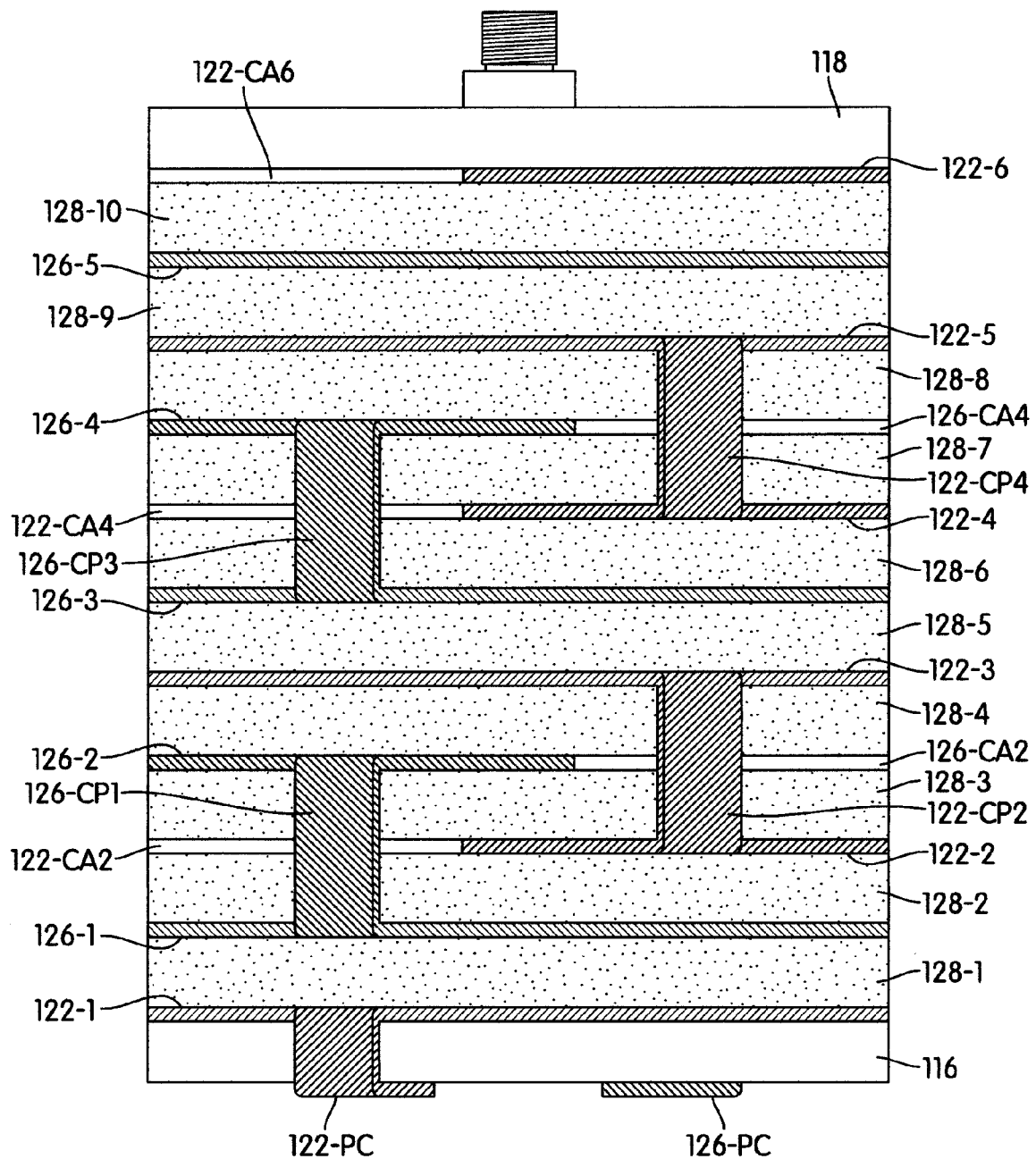
FIG. 11 illustrates a detailed view of the area between sides A and B of a first exemplary embodiment the electrostatic filtration cartridge.

FIG. 11 illustrates a view of the first exemplary embodiment of the electrostatic filtration cartridge 100 from a position between Sides A and B.

The first conductive plate 122-1 of set of plates having an even number of plates 120 lies on top of the non-conductive bottom end piece 116 and is coupled to the first power connector 122-PC that wraps around a portion of circumference of the non-conductive bottom end piece 116 as also illustrated in FIG. 5A. The first conductive coupling portion 122-CP1 is coupled on the first end to the first conductive plate 122-1 and the second end of the first conductive coupling portion 122-CP1 is coupled to second conductive plate 122-2 as can be seen FIG. 13 (the view between Sides C and D). The second conductive coupling portion 122-CP2 couples the second conductive plate 122-2 to the third conductive plate 122-3. The third conductive plate 122-3 is coupled to the first end of the third conductive coupling portion 122-CP3 and the second end of the third conductive coupling portion 122-CP3 is coupled to the fourth conductive plate 122-4 as can be seen in FIG. 13 (the view between Sides C and D). The fourth conductive plate 122-4 is coupled to the first end of the fourth conductive coupling portion 122-CP4 and the second end of the fourth conductive coupling portion 122-CP4 is coupled the fifth conductive plate 122-5. The fifth conductive plate 122-5 is coupled to the first end of a fifth conductive coupling portion 122-CP5 and the second end of the fifth conductive coupling portion 122-CP5 is coupled to sixth and final conductive plate 122-6 as shown in FIG. 13 (the view between Sides C and D). The above has been a description of the location and placement of the elements of the "even" set of plates 120.

The location and the placement of the conductive plates of the "odd" set of plates that are interleaved with the "even" set of plates described above is described below. It should be noted that layers of filter media portions are placed in between the conductive plates.

The placement of the "odd" set 124 including the odd number of conductive plates 126 begins with the second power connector 126-PC that wraps around a portion of the circumference of the bottom end piece 116 as also illustrated in FIG. 5C and is coupled to the first conductive plate 126-1.

The placement of the "odd" set 124 including the odd number of conductive plates 126 continues with the placement of the first conductive plate 126-1 on to the top of the first layer of filter media portion 128-1. The first end of a first conductive coupling portion 126-CP1 is coupled to the first conductive plate 126-1 and the second end of the first conductive coupling portion 126-CP1 is coupled to a second conductive plate 126-2. The first end of the second coupling plate 126-CP2 is coupled to the middle of the opposite side second conductive plate 1262 and the second end of the second coupling plate 126-CP2 is coupled to the middle of the opposite side of third conductive plate 126-3 as illustrated in FIG. 13 (the view between Sides C and D). The third conductive plate 126-3 is coupled to the first end of the third conductive coupling portion 126-CP3 and the second end of the third conductive coupling portion 126-CP3 is coupled to a fourth conductive plate 126-4. The opposite side of the fourth conductive plate 126-4 is coupled to the first end of a fourth conductive coupling portion and the second end of the fourth conductive coupling portion 126-CP4 is coupled to the opposite side of the fifth and final conductive plate 126-5 as illustrated in FIG. 13 (the view between Sides C and D).

As can be observed from FIG. 11 the elements of this first exemplary embodiment of the electrostatic filtration cartridge 100 include: six conductive "even" set plates 122-1-122-6 interweaved with five "odd" set plates 126-1-126-5; ten pieces of filter media portions each piece in between each conductive plate; the top non-conductive end piece 118; and the bottom insulated non-conductive end piece 116.

View Between Sides B and C of Cartridge

FIG. 12 illustrates a view of the first exemplary embodiment electrostatic of the filtration cartridge 100 from a position between Sides B and C is counterclockwise from the position between Sides A and B Side.

The first conductive plate 122-1 of a set of plates having an even number of plates ("even" set) 120 lies on top of the non-conductive-bottom end piece 116 and is coupled to the first power connector 122-PC that wraps around a portion of the circumference of the bottom end piece 116 as shown on FIG. 11 (between Sides A and B) and FIG. 14 (between Sides and between Sides D and A and also illustrated in FIG. 5A. The first conductive plate 122-1 and the second conductive plate 122-2 are coupled together by the first conductive coupling portion 122-CP1 as illustrated in FIG. 13 (between Sides C and D) and FIG. 14 (between Sides and between Sides D and A) and also illustrated in FIG. 5D. The first end of a second conductive coupling portion 122-CP2 is coupled to the second conductive plate 122-2 and the second end of the second conductive coupling portion 122-CP2 is coupled to the third conductive plate 122-3. The third conductive plate 122-3 and the fourth conductive plate 122-4 are coupled together by the third conductive coupling portion 122-CP3 as illustrated in FIG. 13 (between Sides C and D) and FIG. 14 (between Sides and between Sides D and A and also illustrated in FIG. 5D. The first end of the fourth conductive coupling portion 122-CP4 is coupled to the fourth conductive plate 122-4 and the second end of the fourth conductive coupling portion 122-CP4 is coupled to the fifth conductive plate 122-5. The fifth conductive plate 122-5 and the sixth 122-6 and final conductive plate within the "even" set of conductive plates are coupled together by the fifth conductive coupling portion 122-CP5, see FIG. 13 (between Sides C and D) and FIG. 14 (between Sides D and A as also illustrated in FIG. 5D.

The placement of the "odd" set 124 including the odd number of conductive plates 126 begins with the second power connector 126-PC that wraps around a portion of the circumference of the bottom end piece 116 as also illustrated in FIG. 5C and is coupled to the first conductive plate 126-1.

The first conductive plate 126-1 and the second conductive plate 126-2 are coupled together by the first conductive coupling portion 126-CP1 as illustrated in FIG. 11 (between Sides A and B) and FIG. 14 (between Sides D and A) and also illustrated in FIG. 5C. The second conductive plate 126-2 is coupled to the first end of a second conductive coupling portion 126-CP2 is coupled to the second conductive plate 126-2. The second end of the second conductive coupling portion 126-CP2 is coupled third conductive plate 126-3. The third conductive plate 126-3 and the fourth conductive plate 126-4 are coupled by conductive portion 126-CP3 as illustrated in FIG. 11 (between Sides A and B) and FIG. 14 (between Sides D and A and also illustrated in FIG. 5A. The first end of the fourth conductive coupling portion 126-CP4 is coupled to the fourth conductive-plate 126-4 and the second end of the fourth conductive coupling portion 126-CP4 is coupled to the fifth and last conductive plate 126-5 of the "odd" set of conductive plates.

View Between Sides C and D of Cartridge

FIG. 13 illustrates a view of the first exemplary embodiment electrostatic filtration cartridge 100 from a position between Sides C and D is counterclockwise from the position between Sides B and Side C.

A first conductive plate 122-1 of a set of plates having an even number of plates ("even" set) 120 lies on top of the bottom end piece 116 and is coupled to the first power connector 122-PC that wraps around a portion of the circumference of the bottom end piece 116 as shown on FIG. 11 (between Sides A and B) and FIG. 14 (between Sides and between Sides D and A and also illustrated in FIG. 5A. The first conductive plate 122-1 and the second conductive plate 122-2 are coupled together by the first conductive coupling portion 122-CP1. The first end of a second conductive coupling portion 122-CP2 is coupled to the second conductive plate 122-2 and the second end of the second conductive coupling portion 122-CP2 is coupled to the third conductive plate 122-3 as shown on FIG. 11 (between Sides A and B) and FIG. 12 (between Sides and between Sides B and C and also illustrated in FIG. 5B. The third conductive plate 122-3 and a fourth conductive plate 122-4 are coupled together by the third conductive coupling portion 122-CP3 as also shown on FIG. 11 (between Sides A and B)—illustrated in FIG. 5A. The first end of the fourth conductive coupling portion 122-CP4 is coupled to the fourth conductive plate 122-4 and the second end of the fourth conductive coupling portion 122-CP4 is coupled to the fifth conductive plate 122-5 as also illustrated in FIG. 14 (between Sides and between Sides D and A and in FIG. 5D. The fifth conductive plate 122-5 and the sixth and final conductive plate 122-6 within the "even" set of conductive plates are coupled together by a fifth conductive coupling portion 122-CP5.

The placement of the "odd" set 124 including the odd number of plates 126 begins with the second power connector 126-PC that wraps around a portion of the circumference of the bottom end piece 116 as illustrated herein and in FIG. 5C and is coupled to the first conductive plate 126-1.

The first conductive plate 126-1 and the second conductive plate 126-2 are coupled together by the first conductive coupling portion 126-CP1 as illustrated in FIG. 11 (between Sides A and B) and FIG. 14 (between Sides D and A) and also illustrated in FIG. 5A. The second conductive plate 126-2 is coupled to a first end of the second conductive coupling portion 126-CP2 and the second end of the second conductive coupling portion 126-CP2 is coupled to the third conductive plate 126-3. The third conductive plate 126-3 and the fourth conductive plate 126-4 are coupled by the third conductive plate 126-CP3 as illustrated in FIG. 11 (between Sides A and B) and FIG. 14 (between Sides D and A and also illustrated in FIG. 5A. A first end of the fourth conductive coupling portion 126-CP4 is coupled to the fourth conductive plate 126-4 and the second end of the fourth conductive coupling portion 126-CP4 is coupled to the fifth and last conductive plate 126-5 of the "odd" set of conductive plates.

View Between Sides D and A of Cartridge

FIG. 14 illustrates a view of the first exemplary embodiment of the electrostatic filtration cartridge 100 from a position between Sides D and A is counterclockwise from the position between Sides C and Side D.

The first conductive plate 122-1 of a set of plates having an even number of plates ('even set') 120 lies on top of the bottom end piece 116 and is coupled to an 'even set' first power connector 122-PC that wraps around a portion of the circumference of the bottom end piece 116 as illustrated herein and in FIG. 5A.

The first conductive plate 122-1 and the second conductive plate 122-2 are coupled together by the first conductive coupling portion 122-CP1. The first end of the second conductive coupling portion 122-CP2 is coupled to the second conductive plate 122-2 and the second end of the second conductive coupling portion 122-CP2 is coupled to the third conductive plate 122-3 as shown on FIG. 11 (between Sides A and B) and FIG. 12 (between Sides B and C and also illustrated in FIG. 5B. The third conductive plate 122-3 and the fourth conductive plate 122-4 are coupled together by the third conductive coupling portion 122-CP3 as illustrated herein, FIG. 13 and in FIG. 5D. The first end of the fourth conductive coupling portion 122-CP4 is coupled to the fourth conductive plate 122-4 and the second end of the fourth conductive coupling portion 122-CP4 is coupled to the fifth conductive plate 122-5 as illustrated on FIG. 11 (between Sides A and B) and FIG. 12 (between Sides B and C) and also illustrated in FIG. 5B. The fifth conductive plate 122-5 and the sixth and final conductive plate 122-6 of the "even" set are coupled together by the fifth conductive coupling portion 122-CP5 as illustrated herein, FIG. 13, and FIG. 5D.

The placement of the "odd" set 124 including the odd number of plates 126 begins with an "odd" set power connector 126-PC that wraps around a portion of the circumference of the bottom end piece 116 as illustrated herein FIGS. 12 and 13 and in FIG. 5C and is coupled to the first conductive plate 126-1.

The first conductive plate 126-1 and the second conductive plate 126-2 are coupled together by the first conductive coupling portion 126-CP1 and illustrated and FIG. 13 and FIG. 5A. The second conductive plate 126-2 is coupled to the first end of a second conductive coupling portion 126-CP2 and the second end of the second conductive coupling portion 126-CP2 is coupled to the third conductive plate 126-3 as illustrated in FIG. 12 (between Sides B and C) and FIG. 13 (between Sides C and D and also illustrated in FIG. 5C. The third conductive plate 126-3 and a fourth conductive plate 126-4 are coupled to the third connecting portion 126-CP3 as illustrated herein and FIG. 5A. The first end of the fourth conductive coupling portion 126-CP4 is coupled to the fourth conductive plate 126-4 and the second end of the fourth conductive coupling portion 126-CP4 is coupled to the fifth and last conductive plate of this "odd" set of plates 126-5 as illustrated in FIG. 12 (between Sides B and C) and FIG. 13 (between Sides C and D and also illustrated in FIG. 5C).

Cutaway Areas of Conductive Plates

As illustrated in FIGS. 7-14 each conductive plate 122-1-122-5 and 126-1-1265 has a cutaway area in order to avoid having an "even" set conductive plate 122-1-122-5 from coming in contact with an "odd" set conductive plate 126-1-126-5. Conductive plate 122-6 does not require a cutaway, but the presence of one has no significant effect on the operation of the cartridge. Within FIGS. 7-14 these cutaway areas are clearly illustrated by the clear area (not hatched) to represent the cutaway area of each conductive plate. The cutaway areas are designated in drawings by the CA designation with each cutaway having a unique designation: example: the cutaway for the first conductive plate of the 'even set' 122-1 is designated 122-CA1. The cutaway for the first conductive plate of the "odd" set 126-1 is designated 126-CA1. When viewing the various FIGS. 7-17 it is apparent that a cutaway on an "odd" set conductive plate is always behind a conductive coupling portion of an "even" set conductive plate and that a cutaway on an "even" set conductive plate is always behind a conductive coupling portion of an "odd" set conductive plate. This is the method of preventing a positive conductive plate from contacting a negative conductive plate with a sufficient gap to avoid arcing. The use of the sets of plates with the individual plates within a set coupled by the conductive coupling portions has been illustrated herein. This eliminates the arcing that can occur with connection methods of the prior art.

The cutaways areas illustrated in FIGS. 6 through 14 illustrate a straight line cutaway. However the cutaways may be a curved area with a smaller radius than that of the non-cutaway area. This may provide greater arc protection without any significant loss of electrostatic filtration area. Additionally the conductive coupling portions have been found to provide additional area of electrostatic filtration effectiveness.

First Exemplary Embodiment Details

FIGS. 3-14 illustrate a first exemplary embodiment of the electrostatic filtration cartridge 100. This exemplary embodiment includes: six conductive plates 122-1-122-6 in a first or "even" set of plates; five conductive plates 126-1-122-5 in a second or "odd" set of plates; ten layers of filter media portions each layer 128-1-128-10 between and a first set and a second set of conductive plates and a bottom end piece 116 and a top end piece 118 and a pair of non-conductive connecting rods to be discussed more below.

The conductive plates, conductive connecting portions, and power connectors are all part of the sets of plates as illustrated in FIG. 6 and are made of: aluminum; copper; other conductive metals; or a conductive non-metal such as graphite and conductive polymers.

The filter media portions give support to maintain proper air gaps within the cartridge and conductive plates. The filter media portions desirably includes a dielectric media capable of accepting a D.C. electric charge such as reticulated foam, paper, fiberglass, fiberboard, polyester, cotton, etc. In the most preferred embodiments of the present invention, the filter media portions areas are desirably a media such as reticulated foam, which becomes charged in the vicinity of the electrode plates. These foam pores are of a size selected to collect the desired particles.

The non-conductive rods and end pieces are made of acetal or another appropriate engineering plastic.

The range of high voltage used in the various embodiments herein ranges from 6 KV DC to 15 KV DC depending upon its application and size of the device. In order to operate at a voltage higher than 15 KV DC it may be necessary to enlarge the size of the cutaways in the conductive plates.

FIGS. 3-14 and the related discussion above have illustrated a first exemplary embodiment of the filtration cartridge 100 that includes: a first "even" set of six conductive plates with five conductive coupling portions and a second "odd" set of five conductive plates with four conductive coupling portions; ten layers of filter media portions; a non-conductive bottom end piece and a non-conductive top end piece.

Description of Further Exemplary Embodiments of the Electrostatic Filtration Cartridge Additional exemplary embodiments of the filtration cartridge are illustrated to demonstrate that the number of plates is not limiting so long as each positive plate and each negative plate are in proximity (parallel) of the other. The improved electrostatic filtration system for dielectric fluid can accommodate embodiments of more or less of elements (sets of conductive plates with conductive coupling portions, layers of filter media portions; and a non-conductive bottom end piece and a non-conductive top end piece so long as the embodiment follows the guidance given above.

For ease of discussion the letter m will be used for a first set m conductive plates and the letter n will be used to for a second set of n conductive plates The number of layers of filter media portions equal (m+n)−1 assuming m+n to be equal to the total number of conductive plates. All embodiments are expected to have one non-conductive top end piece and one non-conductive bottom end piece and at least one non-conductive connecting rod. The various embodiments as described herein may have different spacing between conductive plates (filter media portions thickness), size, and high voltage requirements depending upon the application. Any different spacing between conductive plates may require the length of the conductive coupling portions to be different. In addition, any change in the number of conductive plates may require a larger cartridge housing device.

Further Description of Exemplary Embodiments of the Electrostatic Filtration Cartridge The description of the first exemplary embodiment of the Electrostatic Filtration Cartridge 100 was based upon two sets of conductive plates 120 and 124, one of which a first set having an "even" number of conductive plates 122-1 through 122-6 and a second set having an "odd" number of conductive plates 126-1 through 126-5. This first exemplary embodiment as illustrated in FIGS. 7-14 has an "odd" set numbered plates n and an "even" set numbered plates with m=n+1.

However, a first example of a second exemplary embodiment 200 has two sets of conductive plates 202 and 204 each having an equal number of an even number of conductive plates 206-1 through 206-$m$ and 208-1 through 208-$n$ as illustrated in FIGS. 15A-15D. The illustrated version has m and n equal to six, an equal number even number plates.

A second example of a second exemplary embodiment 200 has two sets of conductive plates 202 and 204 each having an equal number of an odd number of conductive plates 206-1 through 206-$m$ and 208-1 through 208-$n$ as illustrated in FIGS. 16A-16D. The illustrated version has m and n equal to seven, an equal number of an odd number of plates.

FIGS. 15A-D illustrate an exemplary embodiment having two sets of plates 202 and 204 with an equal even number of conductive plates. In this case for explanatory purposes the cartridge includes: a first set 202 of six conductive plates 206-1 through 206-6; a second set 204 of six conductive 208-1 through 208-6; five first set conductive coupling portions 206-CP1 through 206-CP5; five second set conductive coupling portions 208-CP1 through 208-CP5; eleven levels of filter media portions 128; a top non-conductive end piece 118; and a bottom non-conductive end piece 116.

FIGS. 16A-D illustrate an exemplary embodiment of two sets of plates 202 and 204 with an equal number of an odd number of conductive plates. In this case for explanatory purposes the cartridge includes: a first set 202 of seven conductive plates 206-1 through 206-7; a second set of seven conductive plates 208-1 through 208-7; six first set conductive coupling portions 206-CP1 through 206-CP6; seven second set conductive coupling portions 208-1 through 208-6; thirteen sets of filter media portions 128; a top non-conductive end piece 118; and a bottom non-conductive end piece 116.

As illustrated in FIGS. 17A through 17D, a third exemplary embodiment of the cartridge contains unequal sets of conductive plates with the first set 202 having a greater number of odd number set of plates than the second set 204 with an even number set of plates. The odd number set 202 has odd number plates 206-1-206-*m* and the even number set 204 has even number plates 208-1-208-*n*. For exemplary purposes FIGS. 17A-D illustrates this embodiment with 7 odd plates and 6 even plates. In this case for explanatory purposes the cartridge includes: a first set 202 of seven conductive plates 206-1 through 206-7; a second set 204 of six conductive plates 208-1 through 208-6; six first set conductive coupling portions 206-CP1 through 206-CP6; five second set conductive coupling portions 208-CP1 through 208-CP5; twelve levels of filter media portions 128; the top non-conductive end piece 118; and the bottom non-conductive end piece 116.

It is important to note that in any workable embodiment at least one positively charge conductive plate is adjacent to at least one negative conductive plate in order for the electromagnetic field to exist and the electrostatic filtration process to work. The sizes of the plates, their distance from each other, and the fluid flow mechanisms are dependent upon the application to which an electrostatic filtration system is applied. The specific filtration cartridge embodiments described in detail above have been created to overcome the arcing and fluid flow difficulties found in the prior art as discussed in the Background and below.

Throughout the discussions of the exemplary embodiments above, the terms coupled and coupling have been used to describe the relationship of the conductive plates with the conductive coupling portions and the power connectors within the sets of conductive plates. As is seen in FIG. 6, the sets of conductive plates are single sheets of conductive material with conductive plates "directly coupled" to the coupling portions and power connectors. The directly coupled term is defined to be a means of coupling without any means external to the conductive plates of the set of conductive plates. The conductive plates of the prior art have "indirectly coupled" means of coupling the conductive plates of a set to each other. Examples of the term "indirectly coupled" are the springs or screws as in illustrated in FIGS. 1 and 2.

Detailed Description of the Electrostatic Filtration Cartridge Housing

The exemplary embodiments illustrated above include an electrostatic filtration cartridge housing 102 cylindrical in shape and has a height and radius sufficiently larger than the electrostatic filtration cartridge 100 to hold the electrostatic filtration cartridge 100 and provide physical support for the electrostatic filtration cartridge 100.

Figure 18:
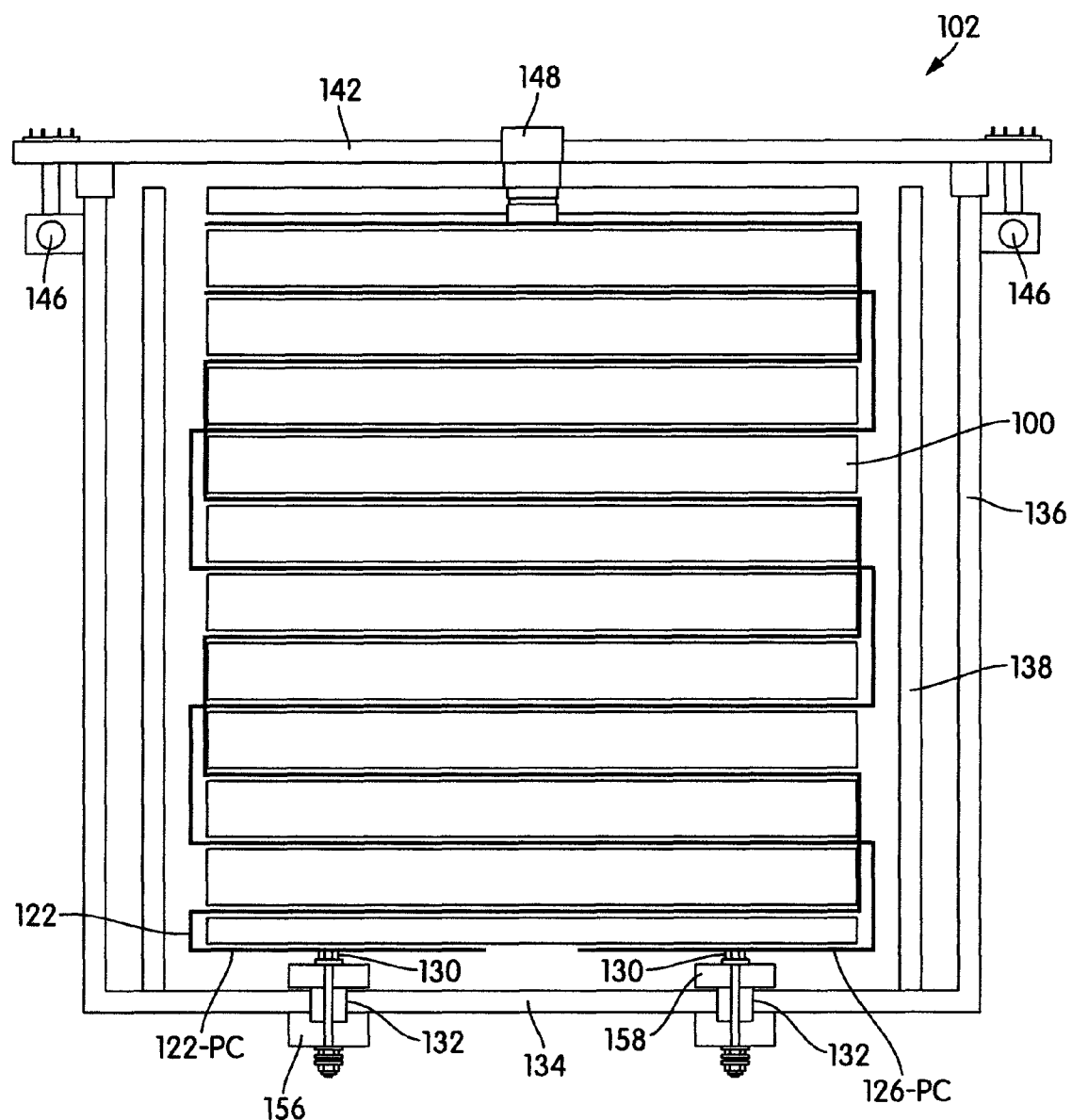
FIG. 18 illustrates the electrostatic filtration cartridge housing.

As illustrated in FIG. 18, the electrostatic filtration cartridge (cartridge) 100 in which all the actual filtration is performed is mounted inside an electrostatic filtration cartridge housing (cartridge housing) 102 that protects the cartridge and the personnel using the electrostatic filtration system. The physical support of the filtration cartridge begins at the bottom of the cartridge housing where a pair of insulated electrical contacts 130 provides the coupling of the high voltage to the first Power Connector for a first set of conductive plates and to the second Power Connector for a second set of conductive plates. In addition, for the electrical support: the conductive insulators provide the "feed-through" openings 132 in the cartridge housing frame 134; and high voltage support for the two power connectors. The insulated electrodes couple the high voltage through openings 132 of the frame of the cartridge housing 134. The positive polarity voltage and negative polarity voltage may be connected to the "even" set or the "odd" set of the first exemplary embodiment in that order or the reverse. In other words, the set of conductive plates are polarity insensitive. This is true for all cartridge embodiments discussed above. The coupling of the power from the insulated electrical contacts to the cartridge 102 may be pressure by the weight of the cartridge 102 and forced pressure on the cartridge 102 and/or by the use of a conductive adhesive.

In order to provide an electrical barrier between the sides of the cartridge 102 and the wall frame 136 of the cartridge housing 102, a non-conductive protective surrounding "pipe" 138 is placed between the outer circumference of the cartridge 100 and the inside of the wall frame 136 of the cartridge housing 102.

A contaminated fluid input is located in the bottom, center of the cartridge housing near the bottom center of the cartridge thus providing a source of contaminated dielectric fluid for the filtration process (not illustrated in FIG. 18).

A "processed" fluid output at the top of the filtration cartridge is coupled to a cartridge housing fluid output 138 having a support arrangement within the top cover 140 of the cartridge housing 102 that provides the processed fluid output of the cartridge housing 142. The cartridge fluid output mechanism also applies a pressure loading to provide top support for the filtration cartridge 100. This pressure loading (in addition to the weight of the filtration cartridge) is to apply pressure onto the electrical contact between the two power connectors on the bottom of the filtration cartridge and the top of the insulators.

Four locking devices 144 are mounted at the top of the outside wall 144 of the cartridge housing to lock the top cover 140 down and apply the pressure on the processed fluid output discussed above. The frame 134 and the top cover 140 may be conductive or non-conductive since the high voltage power and the cartridge are totally electrically insulated from the frame 134.

Description of the Electrostatic Filtration Support Housing

The cartridge discussed above performs the actual filtration process and the cartridge housing provides the physical and operational support and protection of the cartridge and the personnel using the electrostatic filtration system. The electrostatic filtration system housing (system housing) houses the cartridge housing and its cartridge as well as the various support devices for the system. These include: a coupling of a contaminated fluid input of the system housing to a pump and to the fluid input connection of the cartridge housing via a discharge gauge and a pump suction gauge; the processed fluid output of the cartridge housing is coupled to output valve; a high voltage power supply coupled to the insulators and on the bottom of the cartridge housing 102; and a mounting stand to support the cartridge housing. In addition there may be locations for fluid measurement systems to observe the quality level of the contaminated fluid and the processed fluid. Additionally there may be a pressure relief valve to protect the pump from over pressuring. Additionally the system housing may include a water filtration system at the input of the electrostatic filtration system for removing water from the contaminated fluid before performing the electrostatic filtration process. There may also be a barrier filter at a processed fluid output for removing any residual contaminants not captured within the cartridge.

All three principal elements of the exemplary embodiments of the electrostatic filtration system i.e. the cartridge 100, the cartridge housing 102 and the system housing have been discussed herein. Other embodiments may have different variations of the elements of the exemplary embodiment. However the principal common element of the various embodiments include: a "first set" of conductive plates having a given number of conductive plates m and m−1 conductive coupling portions; a "second set" of conductive plates n and n−1 conductive coupling portions may have the same number of plates or one less or one more number of conductive plates than the m set; and ((m+1)−1) layers of filter media portions. All embodiments of the cartridge are expected to have: one top non-conductive end piece; one bottom non-conductive bottom; and one or more non-conductive connecting rods. As illustrated herein the various embodiments include only one cartridge within its cartridge housing. However, there may be further embodiments having two or more cartridges 100 each within their cartridge housings 102 and supported by a common support system.

Method of Use of Electrostatic Filtration System

The method of using the electrostatic filtration system with an improved electrostatic filtration depends heavily upon the features of the filtration cartridge 100 described in extensive detail above. The source of contaminated fluid is usually in a reservoir of fluid and is passed through the device that is using the fluid involved. The fluid to be processed is fed to a fluid input on the system housing and fed to a pump system that provides the contaminated fluid to the fluid input portion at or near the bottom of filtration cartridge housing. The fluid inputted to the inside of cartridge housing flows up in between a wall insulator surrounding the filtration cartridge and the outer circumference of the filtration cartridge. The fluid rises and begins to flow into the filter media portions of the filtration cartridge. The contaminated fluid can enter the cartridge at any level and is not forced through any single level. The contaminated fluid flows into each filter media portion towards the center of the cartridge and through the center opening of each layer of filter media portion and conductive plates, forcing the filtered fluid upwards to the opening at the top of the cartridge. As can be observed the bottom end piece 116 has no center opening, thus forcing the fluid reaching the center of the cartridge upwards. The only way for any portion of the contaminated fluid to escape the cartridge housing is for it to be subject to at least one electrostatic field. There is no bypass to escape the electrostatic field before fluid leaves the housing.

The high voltage power supply is coupled to the sets of conductive plates within the cartridge that creates at least one set of positively charged conductive plates and at least one set of negatively charged conductive plates thus creating an electromagnetic field within each filter media portion by charging said positively charged conductive plates and said negatively charged conductive plates. Each conductive plate is coupled to conductive direct coupling portions and may include a cutaway portion positioned providing a capability of minimizing electrical contact or arcing between one set of a plates with one polarity and another set of plates with an opposite polarity.

Comparison with Prior Art

At the conclusion of the Background section it was indicated that there was a need for an electrostatic filtration design that is not subject to arcing, resistance burns and/or the risk of clogging of fluid flow by a single level of filtration. Specifically there has been a need for an electrostatic filtration device that can efficiently transfer the high voltage power to its electrodes without arcing developing at contact points between the source and the electrodes.

Within the cartridge of the improved electrostatic filtration system disclosed herein, there are no areas of contact between any conductive plate within and another conductive plate within the same set. The sets of conductive plates are each a continuous piece of conductive material cut from a single sheet of the conductive material. There is no place for ohmic resistance to develop within the cartridge.

Additionally, each conductive plate within a first set of conductive plates has a cutaway portion sized and shaped to avoid any contact with the conductive plates of a second set. These cutaways provide sufficient distance to avoid any high voltage arcing between two sets of plates each having a different polarity of high voltage. As a result, in this improved electrostatic filtration configuration the high voltage electricity has an easy passage all the way to the top of the cartridge without any use of springs or electrical insulators, or a series of any male threaded extensions within the cartridge as described in the prior art. Each single sheet of conductive plates conducts electricity to the last plate within a set without any intermediate or indirect coupling means within the cartridge.

Figure 2:
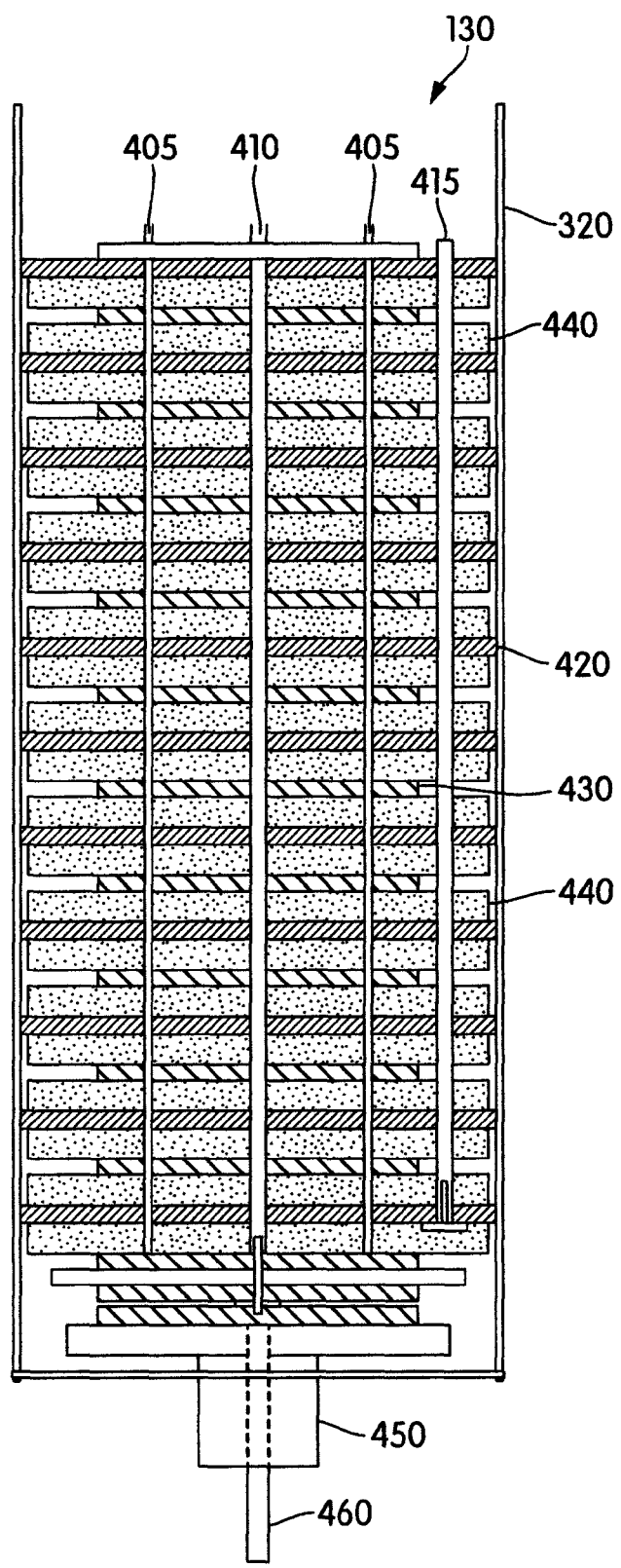
Figure 2A:
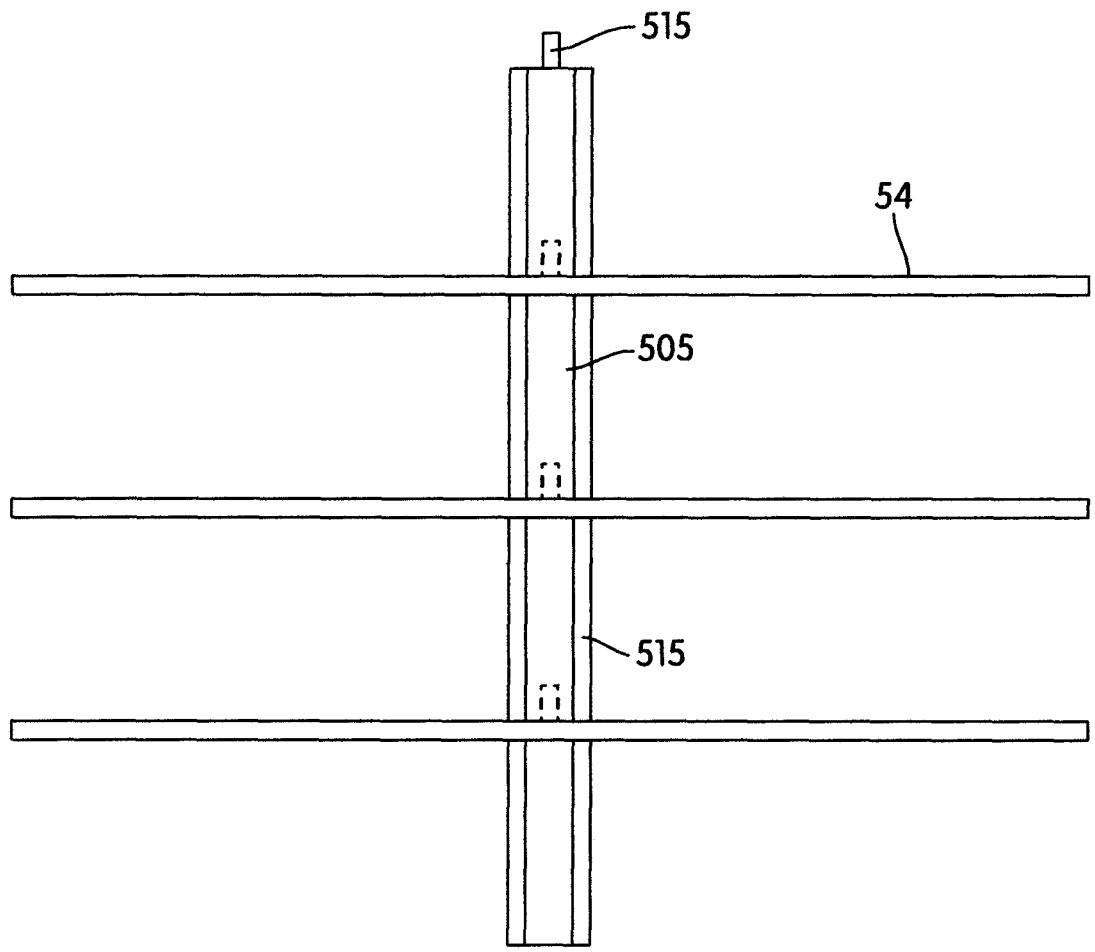
Figure 2C:
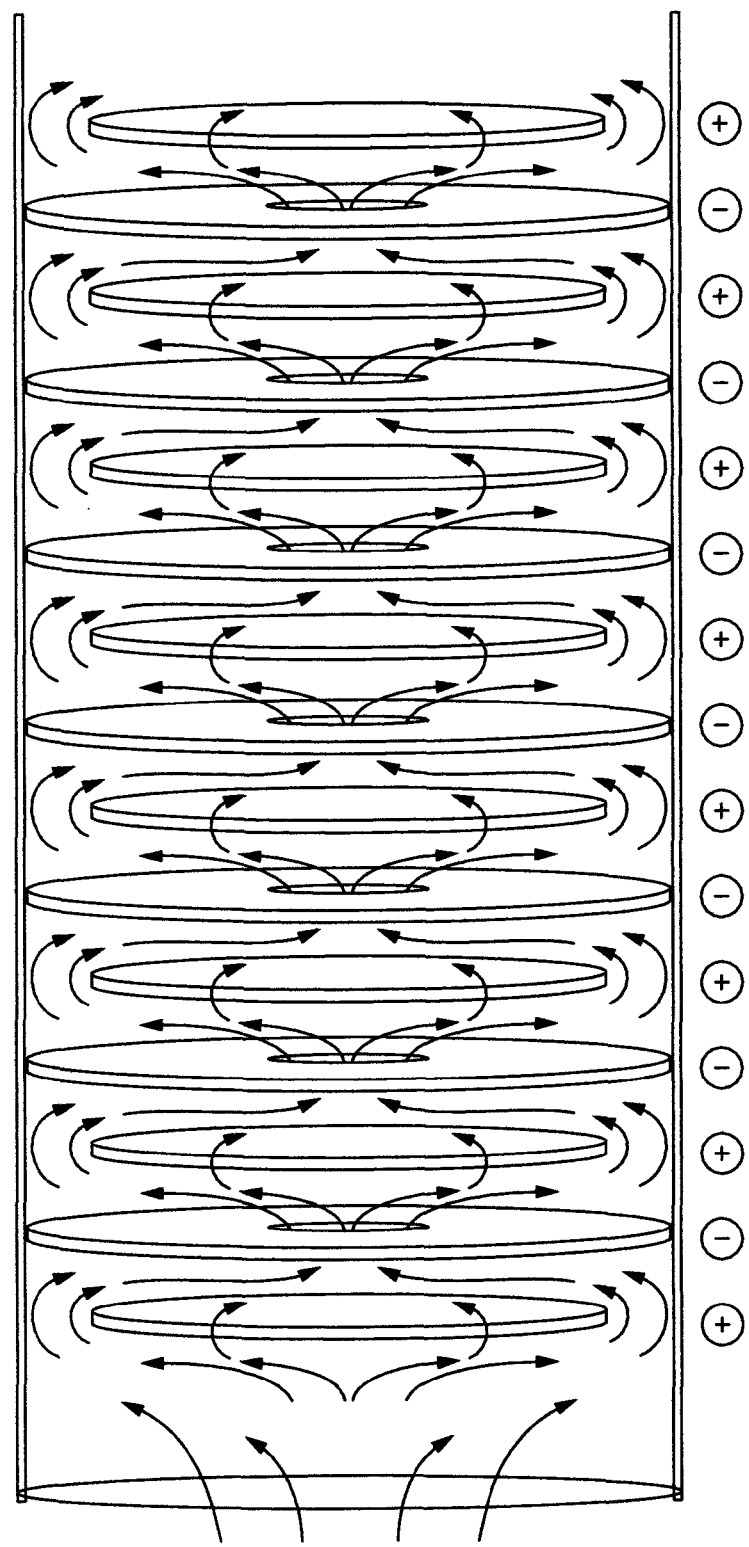

With regard to the risk of clogging of the fluid flow by a single level of filtration, the prior art illustrated in FIG. 2C illustrates a series flow of the contaminated fluid through the filter cartridge. If any one of these individual filtration media portions in FIG. 2C becomes clogged, the flow may stop requiring replacement of the filtration cartridge. Since the bottom filter media portion does the mass extraction of the contamination removal it has a high potential to clog fast rendering the rest of the unit useless.

The exemplary embodiments described above differ from the prior art in the way electricity flows through the electrostatic filter cartridge, which now prevents the filter from accumulating electrical resistance that diminishes the effectiveness of the filter; the way the filter is secured in place within the housing; and the use of insulators to allow the filter to be placed safely within a metal housing, rather than using a non-conductive material to enclose the cartridge. As shown in FIGS. 3-14 every other plate is coupled with a conductive connector portion. The set of conductive plates consist of a single piece of conductive material folded over to create a positive set of conductive plates and a negative set of conductive plates. This eliminates the electrical resistance completely due to the fact that all of the positive and negative conductive plates are connected and do not have to utilize any more contact points within the cartridge. The only contact point is from the bottom electrical insulator of the housing, as illustrated in FIG. 3) to the bottom filter element contact point 122-PC and 126-PC. Further, the filter function is not affected by which set of plates adopts the positive charge and which set of plates adopts the negative charge.

Additionally the exemplary embodiments illustrate conductive plates within the two sets of conductive plates are not complete circles. These cutaway areas are to maintain a proper air gap at places where the conductive coupling portion of the opposite series of conductive plates exists within the cartridge. Without such an air gap of a certain minimum size, the high voltage will arc to the opposite plate. When the connective portions fold up and connect to the next set of plates (every other plate) the correct air gap must be maintained. This cut-out area satisfies the required air gap needed between the oppositely charged plates.

When being installed, the cartridge can be placed in one direction within the cartridge housing or it can be spun 180 degrees and placed in the filter housing without any change in effectiveness of the unit.

Also in the prior art the electrical rods are utilized to bring the electricity through the floor of the housing. Given that these two rods are charged and pass up through the floor of the cartridge housing, the housing material of that prior art must be non-conductive. With the help of electrical insulators passing through the floor of the cartridge housing, the various exemplary embodiments can utilize metals for the housing structure. The instant application also uses two threaded guide rods (unrelated to the electrical current) to hold the filter elements in place. The filter elements contain two hollow insulated tubes that allow the filter housing guide rods to slide through them. The cartridge sits down in the housing until the electrical bands on the bottom of the cartridge sit on the positive and negative insulated electrical contacts in the bottom of the cartridge housing. A pair of washers and nuts is used to secure the cartridge down to the housing, ensuring a solid contact point for the insulated electrical contacts on the bottom of the cartridge housing.

For safety purposes and to prevent any static charge from accumulating between the cartridge housing and the cartridge, the instant application uses insulators inside the housing walls and floor. A non-conductive wall insulator or other insulating means is placed inside the filter housing that is directly inside the walls of the metal housing and directly outside of the filter cartridge. To ensure a solid seal out of the top of the filter cartridge, a special non-conductive plastic tube is used that fastens into the metal lid of the enclosure. The other end of the plastic tube slides down into the top lid of the cartridge and seals, so that all fluid exiting the housing must pass from the outside of the cartridge inwards through the electrical fields to the center of the cartridge and then out of the top oil outlet tube to escape the housing. As a result, all fluid must pass through the cartridge before leaving the housing, thereby increasing the efficiency and effectiveness of the filtration unit.

Summary of Features of the Improved Electrostatic Filtration System

A principal advantage of the improved electrostatic filtration system over the prior art shown in FIGS. 1 and 2 is the placement of a pair of sets of conductive plates having cutaway areas that are interleaved throughout the filtration cartridge with filter media portions between the plates of each pair of conductive plates. The placement of the plates has minimized sources of arcing within the cartridge. While the exemplary embodiments illustrate sets of a series of conductive plates and conductive coupling portions all of which are part of a continuous piece of conductive material (as illustrated in FIG. 6), there is an alternative way of accomplishing the same goal. Each conductive plate may be coupled to another plate in its set by using individual conductive coupling portions that are coupled to a conductive plate with a conductive adhesive. Examples of such conductive adhesive are: graphite filled electrically conductive adhesive; nickel filled electrically conductive adhesive; silver coated nickel filled electrically conductive adhesive; or silver filled electrically conductive adhesive.

A second advantage of the improved electrostatic filtration system disclosed herein is the parallel flow of the contaminated fluid through the filtration process without any significant loss of efficiency and the avoidance of premature clogging of the filter cartridge in a series system such as the one used in the prior art.

In addition as discussed above, the conductive coupling portions CP have provided extra surface area for the electrostatic filtration process.

Projected Applications for an Improved Electrostatic Filtration System

As discussed above, the Applicant believes the exemplary embodiments discussed above are the core of other embodiments and applications beyond those illustrated above.

As an example, it is probable that a small embodiment containing a few pair of conductive plates and a high voltage power supply could be applied as a replacement for an oil filter in an automotive or truck engine, providing a much longer life for the oil with a possible improvement in engine life.

In the area of Functional Fluids embodiments these embodiments and applications include, but are not limited to: hydraulic fluids; Synthetic (Esters/PAO's) fluids; Transmission fluids; Compressor fluids; Refrigeration fluids; Process—Rubber fluids; process—Aromatic fluids; White fluids; Insulating fluids; Other Synthetic fluids; Metal Working/Cutting fluids; Forming/Stamping fluids; Protecting fluid and Treating; Diesel Fluid; and Quenching fluids.

In the area of Hydraulic Fluids embodiments these embodiments and applications include but are not limited to: Aviation Aerospace fluids; Missile guidance system fluids; Equipment manufacturing fluids; Rebuilding and service fluids; Fluid blenders and suppliers fluids; Metal working fluids; Plastic injection molding fluids; Construction fluids; Agriculture fluids; Automobile fluids; Truck and automobile transmission fluids; Marine motive power and steering fluids; Military ground weapon fluids; Freight and personnel elevator fluids; Mining fluids; Train track repair equipment fluids; Solid waste disposal truck fluids; Fossil fuel production fluids; and Printing fluids.

In the area of Insulating Oil Fluids embodiments these embodiments and applications include but are not limited to insulating oil used by: Electric utility companies; Transformer repair companies; Owners of transformers (military, manufacturers, etc.); Electric power providers.

In the area of Turbine Oil Fluids embodiments these embodiments and applications include but are not limited to insulating oil used by: Military aircraft; Commercial aircraft; Private aircraft; Electric utilities; Marine propulsion; Standby generator sets; Stationary Electrical Power Generators, and Engine manufacturers.

Those skilled in the art will recognize that all pumps, valves, electrical sources, switches and the like used to achieve the flows and voltages discussed have not been shown in detail in the interest of conciseness. The improved filtration system may utilize monitoring techniques with pressures and electrical components. However, where not specifically mentioned, those skilled in the art will be familiar with the types and sources for the various components described herein.

Lastly, it should be appreciated that the illustrated embodiments are preferred exemplary embodiments only, and are not intended to limit the scope, applicability, or configuration of the present invention in any way. Rather, the foregoing detailed description provides those skilled in the art with a convenient plan for implementing a preferred exemplary embodiment of the present invention. Accordingly, it should be understood that various changes may be made in the function and arrangement of the elements described in the exemplary embodiments without departing from the spirit and scope of the present invention as set forth in the appended claims.

We claim:

1. An electrostatic filtration cartridge unit for removing contaminants from a dielectric fluid and comprising:
    at least one set m of conductive plates that are non-perforated except for a central hole there through and two off center holes, wherein the center hole is configured to allow a fluid to flow there through;
    at least one set n of conductive plates that are non-perforated except for a central hole there through and two off center holes, wherein the center hole is configured to allow a fluid to flow there through;
    the conductive plates of the m and n sets being interleaved one with another and the conductive plates of the m and n sets respectively being interconnected by conductive connector portions attached fast thereto serially on opposite sides of cartridge unit; and
    a filter media disposed between each of the interleaved conductive plates wherein a single portion of a m or n conductive plate of the cartridge unit is coupled at opposite sides of said cartridge unit to no more than two interleaved conductive plates;
    thereby leaving a single portion of a m or n conductive plate set between each of the filter media; and
    wherein the off center holes are configured to incorporate insulating means arranged to hold the plates and filter media together.

2. A cartridge unit as claimed in claim 1 and wherein the conductive connector portions are integral with the conductive plates.

3. A cartridge unit as claimed in claim 2 and wherein the sets of conductive plates with the conductive connector portions are each formed from a single sheet of conductive material.

4. A cartridge unit as claimed in claim 3 and wherein the sets of conductive plates with the conductive connector portions are pressed or laser cut from a sheet of conductive material.

5. A cartridge unit as claimed in claim 4 and wherein the said conductive material is non-ferrous metal.

6. A cartridge unit as claimed in claim 5 and wherein the non-ferrous metal is aluminum.

7. A cartridge unit as claimed in claim 5 and wherein the non-ferrous metal is copper.

8. A cartridge unit as claimed in claim 1 and wherein the center hole occupies about 5% of the area of the conductive plate.

9. A cartridge unit as claimed in claim 1 and wherein the conductive plates are generally circular.

10. A cartridge unit as claimed in claim 3 and wherein a first set of the sets of conductive plates comprises at least one conductive plate and a second set of the sets of conductive plates comprises at least two conductive plates.

11. A cartridge unit as claimed in claim 10 and wherein one set has one conductive plate more than the other.

12. A cartridge unit as claimed in claim 10 and wherein each set has an equal number of conductive plates.

13. A cartridge unit as claimed in claim 9 and wherein the conductive plates are shaped to avoid arcing or contact between conductive connector portions and a conductive plate of the other set.

14. A cartridge unit as claimed in claim 3 and wherein the sets of conductive plates conductive are polarity insensitive.

15. A cartridge unit as claimed in claim 3 and wherein an end conductive plate of each set has a power connector arranged for connecting the m and n sets to a high voltage source.

16. A cartridge unit as claimed in claim 15 and wherein the high voltage source is from 6 KV to 18 KV.

17. A cartridge unit as claimed in claim 2 and wherein the filter media comprises one or a combination of open-pored foam, pressed cellulose, fiberglass, fiberboard, polyester, cotton and zeolite.

18. A cartridge unit as claimed in 17 and wherein the open-pored foam is reticulated foam.

19. A cartridge unit as claimed in claim 1 and wherein the insulative means comprises non-conductive rods.

20. A cartridge unit as claimed in claim 19 and wherein the rods are threaded through the off center holes in the plates and filter media.

21. A cartridge unit as claimed in claim 19 and wherein the insulative means are formed from acetal.

22. A cartridge unit as claimed in claim 20 and comprising two said rods.

23. An electrostatic filtration cartridge system comprising a cartridge unit as claimed in claim 1 and;
    further comprising a metal cartridge housing,
        the housing comprising of an insulative protector surrounding the sets of plates of the cartridge unit, a contaminated fluid inlet, and a processed fluid outlet.

24. A cartridge system as claimed in claim 23 incorporating pressure means arranged to maintain electrical contact to the conductive plates.

25. A cartridge system as claimed in claim 23 and wherein the cartridge housing is openable and closable and the cartridge unit is replaceable therein.

26. A cartridge as claimed in claim 1 and arranged for configuration in vertical array with contaminated fluid supply at a lower end thereof and processed fluid outflow at an upper end thereof.

27. A cartridge as claimed in claim 1 and wherein the conductive plates are 1 to 2 mm thick.

28. A cartridge as claimed in claim 1 and wherein the conductive plates have a diameter of nine inches and the connector portions are 1 inch (2.54 cm) broad.

29. The cartridge of claim 1 wherein when installed in an electrostatic filtration system, contaminated fluid is pumped to said cartridge and said contaminated fluid flows upward along an outer wall of said cartridge and in a parallel fashion flows radially inwards away from said outer wall in the presence of an electrical field between each positively charged conductive plate and each negatively charged conductive plate and flows upwardly through a center opening of each said conductive plate, and each fluid media to a fluid output within a top non-conductive end piece.

30. The cartridge of claim 1 is installed within an electrostatic filter system comprising:
    a cartridge housing comprising:
    a non-conductive protective barrier surrounding the electrostatic filtration cartridge;

a pair of insulators that provides high voltage power and physical support for the electrostatic filtration cartridge;
a fluid input that couples contaminated fluid to the electrostatic filtration cartridge;
a fluid output that couples processed fluid out of the electrostatic filtration cartridge housing;
a metallic cover to support the electrostatic filtration cartridge and
a metallic frame supporting the electrostatic filtration cartridge; and,
said system housing comprises:
the filtration cartridge housing;
a high voltage power supply coupled to the electrostatic filtration cartridge housing;
a contaminated fluid input coupled to one or more pump inputs;
a contaminated fluid output;
a processed fluid output coupled from the electrostatic filtration cartridge housing to the processed fluid output of the filtration system housing;
a power connection on a frame of the filtration system housing to provide power to the one or more pumps;
a cover;
various shut off valves and pressure measurement devices.

\* \* \* \* \*